US012637860B2

(12) United States Patent
Freidenberger et al.

(10) Patent No.: US 12,637,860 B2
(45) Date of Patent: *May 26, 2026

(54) JOIST TABLE SYSTEMS AND METHODS

(71) Applicant: NUCOR CORPORATION, Charlotte, NC (US)

(72) Inventors: Jason Alan Freidenberger, Darlington, SC (US); Joseph Patrick Cagle, Florence, SC (US); Christopher Ray Couch, Huntertown, IN (US); Richard Thomas Erickson, Madison, AL (US); Travis Marshall Fuhrman, Simpsonville, KY (US); John Lyman Hale, Corinne, UT (US); Matthew Glenn Hire, Spencerville, IN (US); Christopher William Martin, Monroeton, PA (US); James E. Ogburn, III, Darlington, SC (US); Jonathan Pressley Poston, Florence, SC (US); Peter Michael Puglisi, Painted Post, NY (US); Phillip Murray Sylvester, Jr., Florence, SC (US); Adam Taylor Watkins, Henagar, AL (US)

(73) Assignee: NUCOR CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/224,288

(22) Filed: May 30, 2025

(65) Prior Publication Data

US 2025/0290316 A1     Sep. 18, 2025

Related U.S. Application Data

(63) Continuation of application No. 18/593,188, filed on Mar. 1, 2024, now Pat. No. 12,320,117, which is a
(Continued)

(51) Int. Cl.
B23P 19/04 (2006.01)
B23K 37/04 (2006.01)
(Continued)

(52) U.S. Cl.
CPC ................ E04C 3/04 (2013.01); B23P 15/00 (2013.01); B23P 19/04 (2013.01); B25J 9/0096 (2013.01);
(Continued)

(58) Field of Classification Search
CPC ........... Y10T 29/49625; Y10T 29/5397; Y10S 269/91; B23K 37/04–0408;
(Continued)

(56) References Cited

U.S. PATENT DOCUMENTS

| | | | |
|---|---|---|---|
| 3,599,562 | A | 8/1971 | Hutchens, Sr. |
| 3,894,908 | A | 7/1975 | Troutner et al. |

(Continued)

*Primary Examiner* — Matthew P Travers
(74) *Attorney, Agent, or Firm* — Moore & Van Allen PLLC; Jeffrey R. Gray

(57) ABSTRACT

A joist assembly system that is structured for dynamic retrieval of components, dynamic and precise positioning and location of retrieved components, assembly of the components to form a joist, and delivery of the assembled joist. The joist assembly system has a plurality of material handling systems, a plurality of welding systems, and a rigging table system. The material handling systems are structured to load and position the components such as chords and webs onto the rigging table. The rigging table in turn supports the chords or webs. Subsequently, the plurality of welding systems weld the webs to the chords to form the joist.

20 Claims, 34 Drawing Sheets

Related U.S. Application Data continuation of application No. 17/744,233, filed on May 13, 2022, now Pat. No. 11,920,347.

(60) Provisional application No. 63/190,458, filed on May 19, 2021.

(51) Int. Cl.

| | |
|---|---|
| *B23K 101/24* | (2006.01) |
| *B23P 15/00* | (2006.01) |
| *B25J 9/00* | (2006.01) |
| *B25J 11/00* | (2006.01) |
| *E04C 3/04* | (2006.01) |

(52) U.S. Cl.
CPC ............. *B25J 11/005* (2013.01); *B23K 37/04* (2013.01); *B23K 2101/24* (2018.08); *E04C 2003/0404* (2013.01)

(58) Field of Classification Search
CPC .... B23K 2101/24; B23P 15/00; B23P 19/007; B23P 19/04; B23P 21/002; B23P 21/004; B23P 2700/00; B25J 9/0093; B25J 9/0096; B25J 11/005; E04C 3/04; E04C 2003/0486–0491

See application file for complete search history.

(56) References Cited

U.S. PATENT DOCUMENTS

| | | | |
|---|---|---|---|
| 5,123,587 | A | 6/1992 | Ashmore |
| 5,617,622 | A | 4/1997 | Anderson |
| 5,702,095 | A | 12/1997 | Williams |
| 5,837,014 | A | 11/1998 | Williams |
| 5,854,747 | A | 12/1998 | Fairlie |
| 5,941,514 | A | 8/1999 | Burcaw |
| 5,947,460 | A | 9/1999 | Williams |
| 6,560,858 | B1 | 5/2003 | Mcadoo |
| 6,712,347 | B1 | 3/2004 | Fredrickson et al. |
| 6,807,903 | B2 | 10/2004 | Anderson |
| 6,817,090 | B1 | 11/2004 | Mcadoo et al. |
| 6,899,324 | B2 | 5/2005 | Fredrickson et al. |
| 6,978,987 | B2 | 12/2005 | Kanjee |
| 7,089,667 | B2 | 8/2006 | Mcadoo |
| 7,093,350 | B2 | 8/2006 | Mcneelege et al. |
| 7,093,829 | B2 | 8/2006 | Fredrickson et al. |
| 7,316,068 | B2 | 1/2008 | Mcadoo et al. |
| 7,484,289 | B2 | 2/2009 | Pinkerton |
| 8,136,804 | B2 | 3/2012 | Leith |
| 8,141,252 | B2 | 3/2012 | Muncie |
| 8,302,292 | B2 | 11/2012 | Mcadoo et al. |
| 8,478,436 | B2 | 7/2013 | Mcadoo et al. |
| 8,688,411 | B2 | 4/2014 | Vanker et al. |
| 9,126,350 | B2 | 9/2015 | Turulin |
| 9,387,558 | B2 | 7/2016 | Muncie |
| 9,555,508 | B2 | 1/2017 | Otjen et al. |
| 10,061,323 | B2 | 8/2018 | Muck et al. |
| 10,589,390 | B2 | 3/2020 | Muncie |
| 11,920,347 | B2 | 3/2024 | Puglisi et al. |
| 12,320,117 | B2 | 6/2025 | Puglisi et al. |
| 2008/0172983 | A1 | 7/2008 | Urmson |
| 2010/0061829 | A1 | 3/2010 | Mcadoo et al. |
| 2010/0154218 | A1 | 6/2010 | Turulin |
| 2021/0237215 | A1 | 8/2021 | Logemann et al. |
| 2022/0009122 | A1 | 1/2022 | Turulin et al. |

DETAIL B-B

DETAIL C-C

DETAIL D-D

DETAIL E'-E'

DETAIL E'-E'

*FIG.* 23
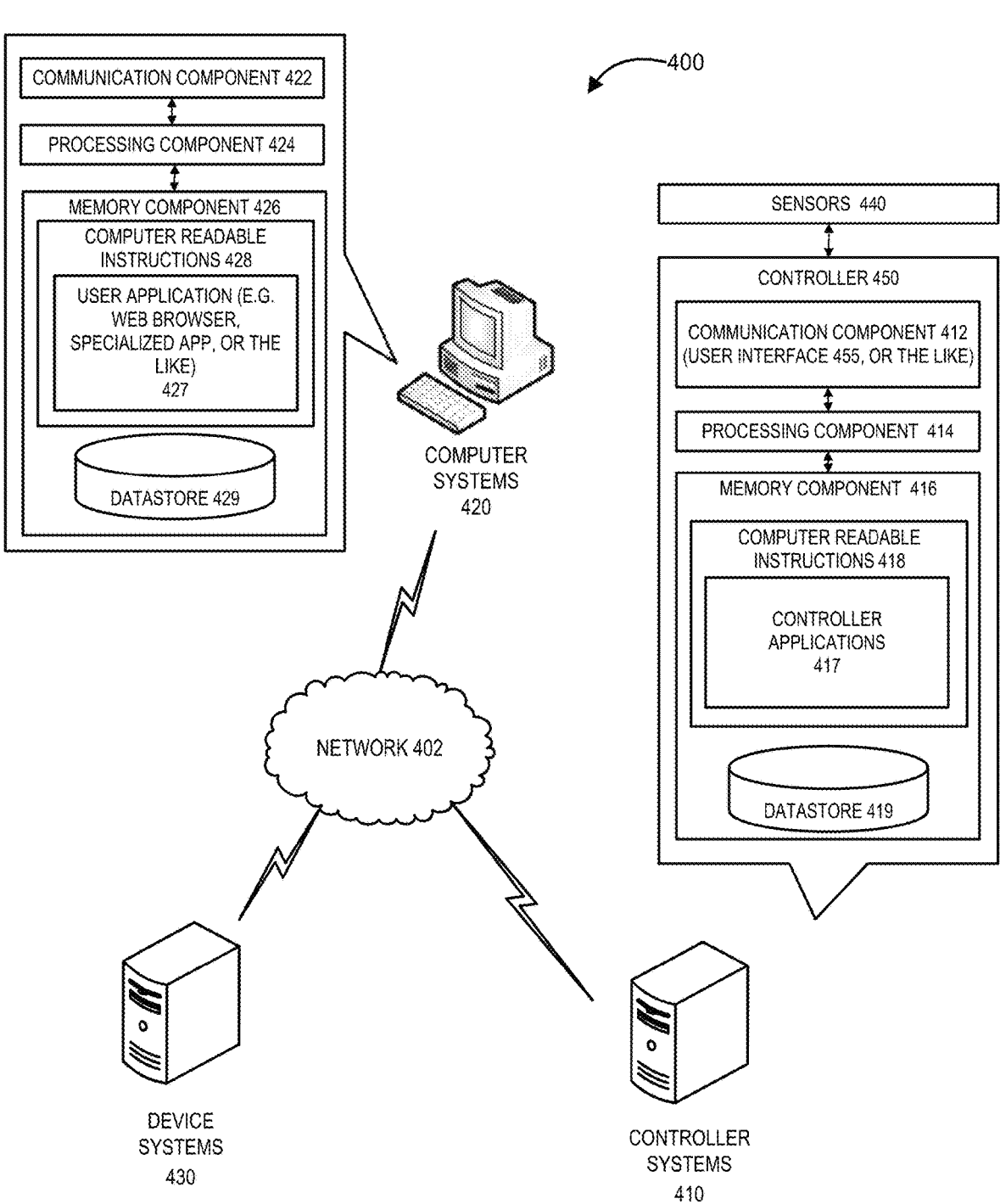

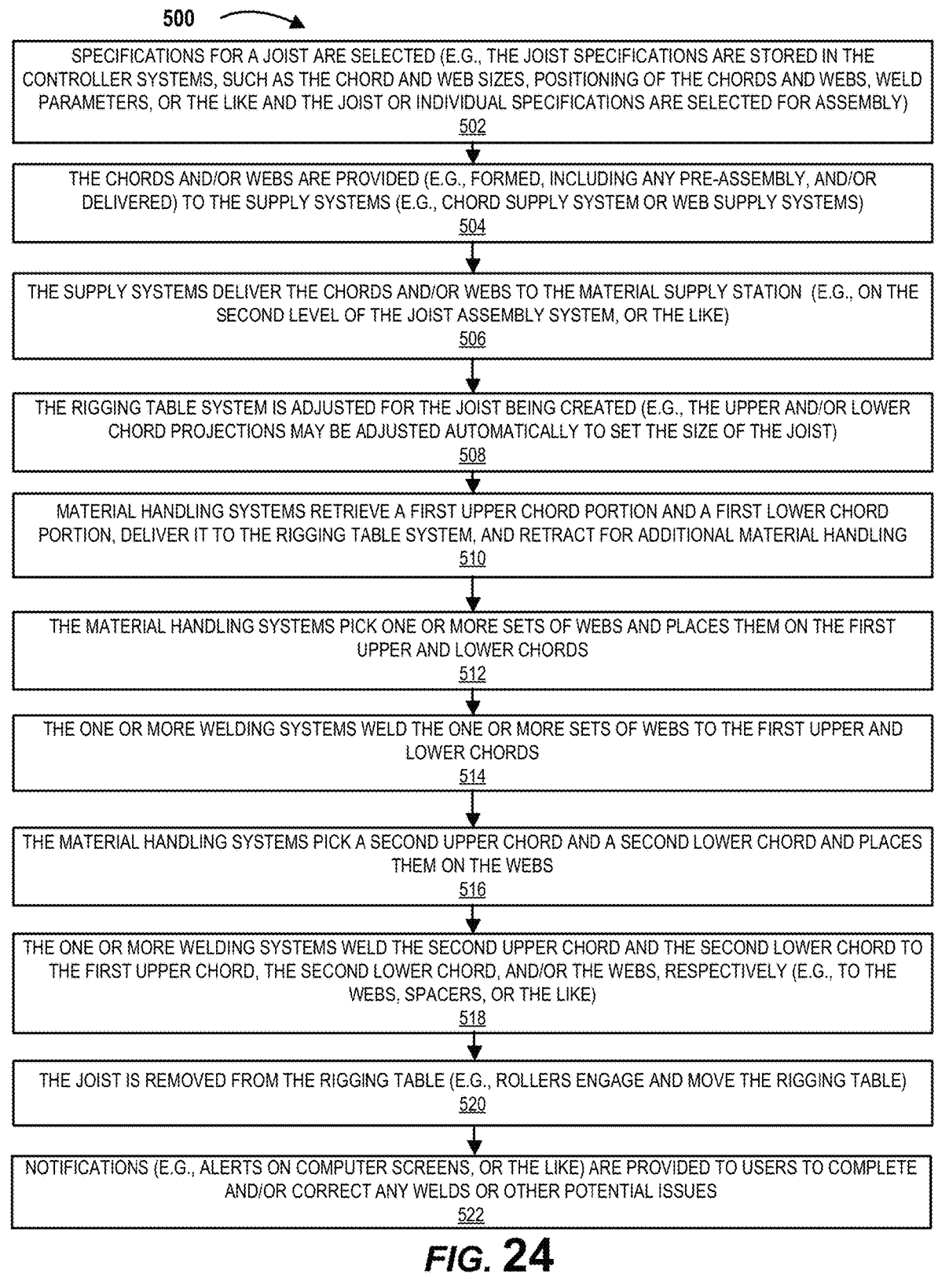

500

SPECIFICATIONS FOR A JOIST ARE SELECTED (E.G., THE JOIST SPECIFICATIONS ARE STORED IN THE CONTROLLER SYSTEMS, SUCH AS THE CHORD AND WEB SIZES, POSITIONING OF THE CHORDS AND WEBS, WELD PARAMETERS, OR THE LIKE AND THE JOIST OR INDIVIDUAL SPECIFICATIONS ARE SELECTED FOR ASSEMBLY)
502

THE CHORDS AND/OR WEBS ARE PROVIDED (E.G., FORMED, INCLUDING ANY PRE-ASSEMBLY, AND/OR DELIVERED) TO THE SUPPLY SYSTEMS (E.G., CHORD SUPPLY SYSTEM OR WEB SUPPLY SYSTEMS)
504

THE SUPPLY SYSTEMS DELIVER THE CHORDS AND/OR WEBS TO THE MATERIAL SUPPLY STATION  (E.G., ON THE SECOND LEVEL OF THE JOIST ASSEMBLY SYSTEM, OR THE LIKE)
506

THE RIGGING TABLE SYSTEM IS ADJUSTED FOR THE JOIST BEING CREATED (E.G., THE UPPER AND/OR LOWER CHORD PROJECTIONS MAY BE ADJUSTED AUTOMATICALLY TO SET THE SIZE OF THE JOIST)
508

MATERIAL HANDLING SYSTEMS RETRIEVE A FIRST UPPER CHORD PORTION AND A FIRST LOWER CHORD PORTION, DELIVER IT TO THE RIGGING TABLE SYSTEM, AND RETRACT FOR ADDITIONAL MATERIAL HANDLING
510

THE MATERIAL HANDLING SYSTEMS PICK ONE OR MORE SETS OF WEBS AND PLACES THEM ON THE FIRST UPPER AND LOWER CHORDS
512

THE ONE OR MORE WELDING SYSTEMS WELD THE ONE OR MORE SETS OF WEBS TO THE FIRST UPPER AND LOWER CHORDS
514

THE MATERIAL HANDLING SYSTEMS PICK A SECOND UPPER CHORD AND A SECOND LOWER CHORD AND PLACES THEM ON THE WEBS
516

THE ONE OR MORE WELDING SYSTEMS WELD THE SECOND UPPER CHORD AND THE SECOND LOWER CHORD TO THE FIRST UPPER CHORD, THE SECOND LOWER CHORD, AND/OR THE WEBS, RESPECTIVELY (E.G., TO THE WEBS, SPACERS, OR THE LIKE)
518

THE JOIST IS REMOVED FROM THE RIGGING TABLE (E.G., ROLLERS ENGAGE AND MOVE THE RIGGING TABLE)
520

NOTIFICATIONS (E.G., ALERTS ON COMPUTER SCREENS, OR THE LIKE) ARE PROVIDED TO USERS TO COMPLETE AND/OR CORRECT ANY WELDS OR OTHER POTENTIAL ISSUES
522

FIG. 24

JOIST TABLE SYSTEMS AND METHODS

CROSS REFERENCE AND PRIORITY CLAIM UNDER 35 U.S.C. § 119

The present application for a patent is a continuation of and claims priority to U.S. patent application Ser. No. 18/593,188 entitled "Joist Table Systems and Methods" filed on Mar. 1, 2024, and issued as U.S. Pat. No. 12,320,117 on Jun. 3, 2025, which claims priority to U.S. patent application Ser. No. 17/744,233 entitled "Joist Table Systems and Methods" filed on May 13, 2022, and issued as U.S. Pat. No. 11,920,347 on Mar. 5, 2024, which claims priority to U.S. Provisional Application No. 63/190,458 entitled "Joist Table Systems and Methods" filed on May 19, 2021, all of which are assigned to the assignee hereof and the entirety of which are incorporated by reference herein.

FIELD

The present disclosure relates generally to joist assembly systems and methods of forming joists using the joist systems. More specifically, a joist system with robots that deliver joists members to a table and weld the joist members together to form the joists.

BACKGROUND

Tables used to assemble structures such as trusses and joists have typically incorporated jigs or supports that hold the chord members and web members together in the desired configuration, which allows a worker to weld the chord members and web members together in the desired configuration. Typically, the members may be delivered to or near the table through the use of a machine, such as through a forklift, conveyor belt, rollers, or the like.

SUMMARY OF THE EMBODIMENTS OF THE INVENTION

The present invention relates generally to a joist assembly system that is structured for dynamic retrieval of components, dynamic and precise positioning and location of retrieved components, assembly of the components to form a joist, and delivery of the assembled joist. Specifically, the joist assembly system comprises a plurality of material handling systems, a plurality of welding systems, and a rigging table system. Typically, the material handling systems are structured to load and position the components such as chords and webs onto the rigging table system. The rigging table system in turn supports the chords or webs. Subsequently, the plurality of welding systems may weld the webs to the chords to form the joist.

One embodiment of the invention is a joist assembly system comprising: a plurality of material handling systems; a plurality of welding systems; and a rigging table system, wherein the material handling systems load chords and webs to the rigging table, the rigging table supports the chords and webs, and the plurality of welding systems weld the webs to the chords.

In further accord with an embodiment of the invention, the joist assembly system further comprises: a support structure having a first level and a second level located at least partially above the first level; wherein the plurality of welding systems are located on the first level; and wherein the plurality of material handling systems are located on the second level.

In yet another embodiment of the invention, the joist assembly system further comprises: a support structure having a first level and a second level located at least partially above the first level; wherein the plurality of material handling systems are located on the first level; and wherein the plurality of welding systems are located on the second level.

In further accord with an embodiment of the invention, the plurality of material handling systems are configured to pick chord portions or webs.

In another embodiment of the invention, the plurality of material handling systems comprise: a plurality of chord material handling systems; and a plurality of web material handling systems.

In yet another embodiment of the invention, the plurality of welding systems comprise: a plurality of first welding systems adjacent a first side of the rigging table system; and a plurality of second welding systems adjacent a second side of the rigging table system.

In further accord with an embodiment of the invention, the rigging table comprises: a plurality of upper chord projections spaced apart to form a plurality of upper chord cavities, wherein the plurality of upper chord cavities hold a first upper chord portion of the chords; and a plurality of lower chord projections spaced apart to from a plurality of lower chord cavities, wherein the plurality of lower chord cavities hold a first lower chord portion of the chords; wherein the plurality of upper chord projections or the plurality of lower chord projections allow the first upper chord portion to be spaced different distances from the first lower chord portion.

In another embodiment of the invention, the plurality of material handling systems are structured to hold the webs in place while the welding systems at least partially weld the webs.

In yet another embodiment of the invention, the rigging table comprises web jigs that are structured to hold the webs in place.

In still another embodiment of the invention, the rigging table is structured to support a first upper chord and a first lower chord of the chords, and webs; wherein the rigging table is structured to support a second upper chord and a second lower chord of the chords positioned over the first upper chord and the first lower chord.

In still another embodiment of the invention, the joist assembly system further comprises a material supply station, wherein the material supply station provides the chords and the webs to a picking location for the plurality of material handling systems.

In still another embodiment of the invention, the rigging table system further comprises a discharging system configured to remove an assembled joist from the rigging table.

In still another embodiment of the invention, the discharging system further comprises a plurality of rollers, wherein the plurality of rollers are configured to extend from the rigging table and retract within the rigging table, wherein the plurality of rollers rotate, and wherein when the plurality of rollers are extended a joist is disengaged from rigging table and rotating rollers move the joist off of the rigging table.

Another embodiment of the invention is a method for assembling a joist, the method comprising: providing a plurality of upper chords, a plurality of lower chords and a plurality of web members at a material supply station; retrieving, via a plurality of chord material handling systems of a plurality of material handling systems, a first upper chord of the plurality of upper chords and a first lower chord of the plurality of lower chords from the material supply station; positioning, via the plurality of chord material handling systems, the first upper chord and the first lower chord at a rigging table system; retrieving, via a plurality of web material handling systems of the plurality of material handling systems, a first plurality of web members of the plurality of web members from the material supply station; positioning, via the plurality of web material handling systems, the first plurality of web members at the rigging table system; joining, via a plurality of welding systems, the first upper chord, the first lower chord, and the first plurality of web members; retrieving, via the plurality of web material handling systems, a second plurality of web members from the material supply station; positioning, via the plurality of web material handling systems, the second plurality of web members at the rigging table system; joining, via the plurality of welding systems, the first upper chord, the first lower chord, the first plurality of web members, and the second plurality of web members; retrieving, via the plurality of chord material handling systems, a second upper chord of the plurality of upper chords and a second lower chord of the plurality of lower chords from the material supply station; positioning, via the plurality of chord material handling systems, the second upper chord and the second lower chord at a rigging table system; joining, via the plurality of welding systems, the first upper chord, the first lower chord, the second upper chord, the second lower chord, the first plurality of web members, and the second plurality of web members to form a joist; and discharging, via a discharging system, the joist from the rigging table system.

To the accomplishment the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE SEVERAL VIEWS OF THE DRAWINGS

The accompanying drawings illustrate embodiments of the present disclosure, in which:

FIG. 23 is a schematic view of a network diagram, in accordance with embodiments of the invention.

FIG. 24 is a process flow illustrating the assembly process using the joist assembly system, in accordance with embodiments of the invention

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIGS. 1-22 illustrate various views of the joist assembly system 1, in accordance with embodiments of the invention. The joist assembly system 1 of the present disclosure is structured for dynamic retrieval of components or members 200, dynamic and precise positioning and location of retrieved components or members 200, assembly of the components to form a joist 220, and delivery of the assembled joist 220.

Figure 25:
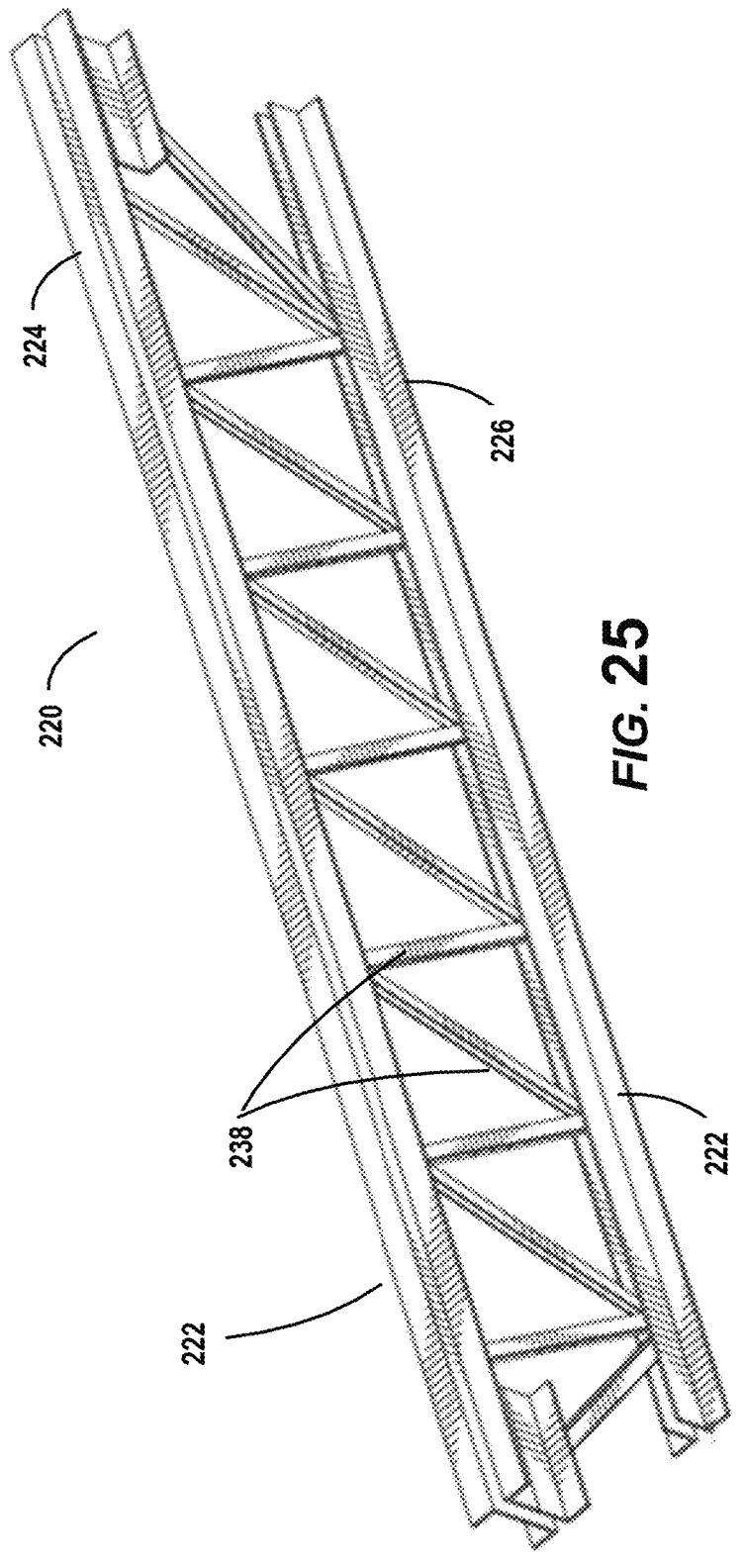
FIG. 25 illustrates one example joist that may be assembled using the joist assembly system, in accordance with embodiments of the invention.

As described herein, the use of the term component 200 or member 200 may refer to one or more parts/components that may be assembled together to form a structural member such as a joist 220. One embodiment of a joist is illustrated in FIG. 25 for reference. In this regard, the components or members 200 may comprise one or more chords 222 and webs 238, or the like, or portions thereof. The chords 222 may comprise one or more upper chords 224 and one or more lower chords 226 with the web members 238 arranged therebetween so that the one or more upper chords 224 and one or more lower chords 226 are spaced apart by a predetermined distance. The joist 220 may be associated with joist parameters such as a minimum joist size, maximum joist size, minimum depth, maximum depth, maximum chord size, chord size, truss depth, web position and orientation, and weld lengths. The chords 222 and webs 238 may have any type of shape (e.g., L-shaped, U-shaped, C-shaped, round, oval, square, rectangular, non-uniform, or the like); however, in the illustrated embodiments the chords 222 are formed from two L-shaped members (e.g., back to back), while the webs 238 are formed from a single L-shaped member.

In general, as illustrated by FIGS. 1-22, the joist assembly system 1 of the present invention comprises a plurality of material handling systems 30, a plurality of welding systems 60, and a rigging table system 10. Typically, the material handling systems 30 are structured to load and position the components or members 200 such as chords 222 and webs 238 onto the rigging table system 10. The rigging table system 10 in turn supports the chords 222 or webs 238. Subsequently, the plurality of welding systems 60 may weld the webs 238 to the chords 222 to form the joist 220. The assembled joist may then be discharged from the rigging table and transported therefrom.

Typically, the joist assembly system 1 may comprise a support structure 94 provided on a support floor 92. Typically, the support floor 92 may comprise a first lateral side 92*a* and an opposite second lateral side 92*b*. Moreover, the support structure 94 may comprise a first level 96 located proximate the support floor 92 and a second level 98 located at least partially above the first level 96. In some embodiments, the support structure 94, as well as its first level 96 and second level 98 may form a structural framework for supporting (e.g., holding, locating, positioning, separating, and/or otherwise accommodating) elements of the joist assembly system 1 such as the a plurality of material handling systems 30, a plurality of welding systems 60, and a rigging table system 10. The support structure 94 may be made from metals, alloys, composites, concrete, plastics, wood, and/or any other suitable natural or synthetic materials. Although, the support structure 94 is described as having two levels, it is understood that support structure 94 may have more or fewer levels.

The support structure 94 may comprise one or more material supply stations 40. The material supply station 40 is structured to supply (e.g., store, stock, provide, or the like) one or more components or members 200 (e.g., one or more chords 222 and webs 238). In this regard, the material supply station 40 may comprise one or more pallets for storing the one or more components or members 200 (e.g., one or more chords 222 and webs 238). Typically, the material supply station 40 may be structured such that the components or members 200 (e.g., one or more chords 222 and webs 238) stored therein may be retrieved by a plurality of material handling systems 30 without obstructing or slowing down the respective material handling system 30 and without dislodging the pallets of the material supply station 40 and other stored components/members 200, as will be described herein in further detail. The material supply station 40 may comprise a first picking location 42 that is structured to store one or more chords 222 and a second picking location 44 that is structured to store one or more web members 238. As illustrated, in some embodiments, the material supply station 40 may be provided at the second level 98. It is contemplated that in other embodiments, the material supply station 40 may be provided elsewhere, such as at the first level 96. As will be described in further detail with respect to FIGS. 21A-22, the material supply station 40 may further comprise web and/or chord supply systems 300 that are used to supply the web members 238 and the chord members 222 to the material supply station 40.

Material Handling Systems

As discussed, the joist assembly system 1 comprises a plurality of material handling systems 30. Typically, the material handling systems 30 are structured to load (e.g., pick, grip, clutch, or the like) members 200 (e.g., one or more chords 222 and webs 238) stored at a respective picking location at the material supply station 40, transport them to the rigging table system 10 and subsequently position the members 200, such as chords 222 and webs 238, onto the rigging table system 10 in a predetermined position and orientation for assembly. Moreover, the material handling system 30 may hold (e.g., maintain, or the like) the members 200 in their correct position/orientation while a plurality of welding systems 60 join (e.g., weld, or the like) the members 200 together, thereby precluding any undesirable displacement during the joining process.

In some embodiments, the joist assembly system 1 is illustrated as having the plurality of material handling systems 30 provided at the second level 98. However, in other embodiments, the plurality of material handling systems 30 may be provided elsewhere, such as at the first level 96. Moreover, the plurality of material handling systems 30 may further comprise a plurality of chord material handling systems 32 that are structured for loading (e.g., picking, transporting, and positioning) one or more chords 222, such as one or more upper chords 224 and/or one or more lower chords 226. The plurality of material handling systems 30 may further comprise a plurality of web material handling systems 34 that are structured for loading (e.g., picking, transporting, and positioning) one or more web members 238. As such, in some embodiments the one or more material handling systems 30 may configured to load both chords 222 and webs 238, or may be specialized that one some material handling systems 30 load only chords 222 while other material handling systems 30 load only webs 238.

In some embodiments, the plurality of material handling systems 30 may be automated (e.g., controllable and/or programmable) machines, such as robots, robotic arms, and/or the like. In this regard, the plurality of material handling systems 30 may comprise an end effector that is structured to pick (e.g., grip, clutch, hold, position, rotate, and/or the like) one or more respective members 200 (e.g., one or more chords 222 and one or more webs 238). The plurality of material handling systems 30 may be chosen from a cartesian robot whose axes are associated with a cartesian coordinate system, a cylindrical robot whose axes are associated with a cylindrical coordinate system, a spherical or polar robot whose axes are associated with a polar coordinate system, an articulated robot such as a 6 axis articulated robot, or the like. The plurality of material handling systems 30, and their end effectors in particular, may comprise multiple degrees of freedom, such as 6 degrees of freedom, to allow for the required picking (e.g., gripping, clutching, holding, positioning, rotating, and/or the like) the one or more respective members 200 (e.g., one or more chords 222 and one or more webs 238). Moreover, the plurality of material handling systems 30, and their end effectors in particular, may be moved (e.g., actuated, controlled, and/or operated) via an actuator (e.g., hydraulic, pneumatic, electric, and/or the like) of the plurality of material handling systems 30.

As discussed above, the plurality of material handling systems 30 may comprise a plurality of chord material handling systems 32 that are structured for loading (e.g., picking, transporting, positioning, and/or the like) one or more chords 222, such as one or more upper chords 224 and/or one or more lower chords 226. In this regard, the respective end effectors (also referred to as material handling grippers) of the plurality of chord material handling systems 32 are structured to pick (e.g., grip, clutch, position, rotate, and/or the like) the chords 222, without interference from or without interfering with the respective material supply station 40, and chord projections (14a, 14b) (described in further detail later) and other staging and tooling components of the rigging table system 10. Similarly, the plurality of material handling systems 30 may further comprise a plurality of web material handling systems 34 that are structured for loading (e.g., picking, transporting, positioning, or the like) the one or more web members 238. In this regard, the respective end effectors (also referred to as material handling grippers) of the plurality of web material handling systems 34 are structured to pick (e.g., grip, clutch, position, rotate, and/or the like) the web members 238, without interference from or without interfering with the respective material supply station 40, and web jigs 18, chord projections (14a, 14b) (described in further detail later) and other staging and tooling components of the rigging table system 10. Moreover, in some embodiments, the end effectors (also referred to as material handling grippers) of the plurality of web material handling systems 34 are structured such that undesirable movement of web members 238 during the loading (e.g., picking, transporting, positioning, or the like) process, even during high speed movements, is restricted. Moreover, in some embodiments, the end effectors (also referred to as material handling grippers) of the plurality of web material handling systems 34 are structured to pick web members 238 of a variety of web lengths, and using a variety of grips such grip low, grip high, or the like.

In some embodiments, the plurality of material handling systems 30, and/or a controller 450 (described in further detail later) associated with the plurality of material handling systems 30 and/or the joist assembly system 1 are structured to measure a picking location and time for each of the chords 222 and/or web members 238 from their respective material supply station 40. In some embodiments, the plurality of material handling systems 30, and/or the controller 450 may construct and utilize a same path for loading and transport of web members 238 of all web lengths. In some embodiments, the plurality of material handling systems 30, and/or the controller 450 may optimize a path for loading of web members 238 of all web lengths. In some embodiments, the plurality of material handling systems 30, and/or the controller 450 may construct and utilize varying paths for loading of web members 238 of varying web lengths.

In some embodiments the joists 220 (e.g., chords 222 and/or web members 238) thereof may have bracing clips (e.g., paddle clips, or the like) that are used for cross-bracing between joists 220 when the joists 220 are installed in a building. Moreover, the joists 220 (e.g., chords 222 and/or web members 238) may have spacers (e.g., fillers, or the like) that are used to space the first upper chord portion 224a apart from the second upper chord portion 224b and/or the first lower chord portion 226a apart from the second lower chord portion 224b. It should be understood that in some embodiments, the bracing clips (not illustrated) and/or the spacers (not illustrated) may be installed on the chords 222 and/or webs 238 prior to being delivered to the material supply station 40. In some embodiments, the bracing clips and/or spacers may be operatively coupled to the chords 222 and/or webs 238 prior to the chords 222 and/or webs 238 being provided to the material supply station 40, within the material supply station 40, and/or after the material supply station 40. The bracing clips may be operatively coupled (e.g., welded, or the like) by users physically welding the bracing clips to the chords 222 and/or webs 238. In some embodiments, a locating system (not illustrated) having a laser, light curtain, etcher, marking device, or the like may mark locations on the chords 222 and/or webs 238 in order to indicate where the bracing clips and/or spacers should be operatively coupled to the chords 222 and/or webs 238. The users may pre-assemble or post-assemble the bracing clips to the chords 222 and/or webs 238. The users may also pre-assemble the spacers to the chords 222. In this way, it should be understood that the pre-welding of the bracing clips and/or spacers may improve the throughput of the joist assembly system 1. That is, the pre-welding may reduce the number of operations (e.g., welding operations, positioning operations, or the like) that are performed by the joist assembly system 1, thus reducing the assembly time of the joist 220 within the joist assembly system 1.

Alternatively, in some embodiments the bracing clips and/or spacers may be positioned automatically by the material handling systems 30 and/or automatically welded by the welding systems 60. As such, the plurality of material handling systems 30, and/or a controller 450 associated with the plurality of material handling systems 30 and/or the joist assembly system 1 may be structured to determine a picking location and time for the predetermined small parts (e.g., bracing clips, spacers, or the like) associated with the joist 220 from their respective material supply station 40. The plurality of material handling systems 30, and/or the controller 450 may place the bracing clip (e.g., paddle clip, or the like) within a placement tolerance of about +/−1 inches along a linear direction and/or a bracing clip placement tolerance of about −⅛ to 0 inches from top and bottom chord faces, and may place the spacer (e.g., filler, or the like) within a placement tolerance of about +/−2 inches in a linear direction and/or a spacer placement tolerance of about 0 to 0.25 inches inboard from far side chord face.

In some embodiments, the plurality of material handling systems 30 are structured to move through placement of respective chords 222 and/or web members 238 in a semi-coordinated and/or fully-coordinated motion. In this regard, a controller 450 associated with the plurality of material handling systems 30 and/or the joist assembly system 1 may determine or construct cycle times for assembling the joists 220 (e.g., retrieval, transport, positioning, joining, assembly, and/or the like steps) for each of the chords 222 and/or web members 238, and coordinate movement and actions of the plurality of chord material handling systems 32 and plurality of web material handling systems 34, accordingly. In some embodiments, the plurality of material handling systems 30 may be configured to place and position the respective chords 222 and/or web members 238 onto the respective locations of the rigging table system 10 at a predetermined maximum speed of semi-coordinated motion, while in other embodiments, the plurality of material handling systems 30 may switch to a predetermined medium or slow speed (or a soft speed mode) for certain steps such as positioning of the respective chords 222 and/or web members 238 onto the respective locations of the rigging table system 10.

Moreover, the plurality of material handling systems 30 are configured for loading respective chords 222 and/or web members 238 within a predetermined tolerance. In this regard, the plurality of material handling systems 30 may be associated with or configure an outline window and repeatedly place the respective chords 222 and/or web members

238 within the window at a predetermined high speed. The plurality of material handling systems 30 are further configured to detect any collisions (and/or prevent subsequent collisions after a collision has been detected). In some embodiments, the plurality of material handling systems 30 are associated with a web member 238 placement tolerance of about +/−0.5 inches along a linear direction. In some embodiments, the plurality of material handling systems 30 are associated with a web member 238 placement tolerance of about +/−0.01, +/−0.05, +/−0.1, +/−0.2, +/−0.3, +/−0.4, +/−0.5, +/−0.6, +/−0.7, +/−0.8, +/−0.9, and/or +/−1 inches, along a linear direction, and/or within a tolerance range with any combination of limits selected from the foregoing. In some embodiments, the plurality of material handling systems 30 are associated with a web member 238 placement tolerance of about −0.25 to +0 inches with respect to top and bottom chord faces. In some embodiments, the plurality of material handling systems 30 are associated with a web member 238 placement tolerance of about −0.1 to +0.1 inches, −0.2 to +0.2 inches, −0.5 to +0.5 inches, −0.25 to +0.1 inches, −0.2 to +0.1 inches, −0.25 to +0.25 inches, −0.3 to +0.3 inches, −0.5 to +0.5 inches, −0.5 to +0.1 inches, −0.4 to +0.1 inches, and/or −1 to +0.5 inches, with respect to top and bottom chord faces, and/or within a tolerance range with any combination of limits selected from the foregoing.

As discussed, the material handling system 30 may hold or maintain the chords 222 and/or web members 238 in their correct position/orientation while a plurality of welding systems 60 join (e.g., weld) the components or members 200 together, thereby precluding any undesirable displacement during the joining process. Here, the plurality of material handling systems 30 may further apply a predetermined downward force onto the chords 222 and/or web members 238 in their correct position/orientation over the rigging table system 10 during the joining process. The controller 450 associated with the plurality of material handling systems 30 and/or the joist assembly system 1 may determine/measure an applied downward force (e.g., a human downward force during configuration) and fit-up. The controller 450 may then compare a downward force associated with the plurality of material handling systems 30, and control the plurality of material handling systems 30 such that the downward force of the plurality of material handling systems 30 meets or exceeds the applied downward force (e.g., a human downward force during configuration). Moreover, the control may verify contact between a web member 238 and a respective top/bottom chord 222, when positioned for assembly on the rigging table system 10.

In some embodiments, the plurality of material handling systems 30 are structured for camber match (e.g., via a soft speed mode). In this regard, the controller 450 may utilize a largest chord 222 to simulate the foregoing. The controller 450 may verify contact with the chord members 222 using camber match tooling (e.g., associated with the rigging table system 10 such as chord projections (14a, 14b), and/or web jigs 18). The controller 450 may further verify contact with web members 238 from the applied downward force, which in some embodiments, may be based on determining consistent web members 238, not touching every web member 238, and/or a gap tolerance of +/−⅛ inches on side chords 222 (e.g., straight chords).

In some embodiments, the plurality of material handling systems 30 and/or the controller 450 may measure structure deflection during the loading (e.g., retrieval, placement, or the like) processes. Moreover, the plurality of material handling systems 30 and/or the controller 450 may minimize the deflection such that the placement of the chords 222 and/or the web members 238 is not adversely affected.

Rigging Table System

As illustrated by FIGS. 1-22, the joist assembly system 1 of the present invention comprises a rigging table system 10. Typically, the rigging table system 10 supports the chords 222 or webs 238 positioned thereon (e.g., by the plurality of material handling systems 30). Subsequently, the plurality of welding systems 60 may join (e.g., weld) the webs 238 to the chords 222 to form the joist 220. The assembled joist 220 may then be discharged from the rigging table 1 and transported therefrom. In some embodiments, the rigging table system 10 comprises a generally elongate arrangement extending from a first table end 82 to an opposite second table end 84. The rigging table system 10 may define a first table side 12a (e.g., a first lateral side) and an opposite second table side 12b (e.g., a second lateral side). Moreover, the rigging table system 10 may be positioned at the first level 96 over the support floor 92 and extend to a height between the support floor 92 and the second level 98.

In some embodiments, the rigging table system 10 comprises a plurality of upper chord projections 14a spaced apart to form a plurality of upper chord cavities 16a. The plurality of upper chord projections 14a together with the plurality of upper chord cavities 16a are structured to hold and support a chord 222 such as a first upper chord portion 224a of an upper chord 224. Moreover, the rigging table system 10 comprises a plurality of lower chord projections 14b spaced apart to from a plurality of lower chord cavities 16b. The plurality of lower chord projections 14b together with the plurality of lower chord cavities 16b are structured to hold and support a chord 222 such as a first lower chord portion 226a of a lower chord 226. Moreover, the plurality of upper chord projections 14a and/or the plurality of lower chord projections 14b allow the first upper chord portion 224a of the upper chord 224 to be spaced different distances apart from the first lower chord portion 226a of the lower chord 226 to allow for assembly of a joist 220 of any required dimensions. Moreover, the rigging table system 10 may comprise a plurality of web jigs 18 that are structured to hold and support web members 238, at any required orientation, inclination and location with respect to each other and with respect to the chords 222. In some embodiments, a controller 450 associated with the plurality of material handling systems 30 and/or the joist assembly system 1 may trigger or cause positioning the chords 222 and web members 238 on the rigging table system 10 in accordance with programmed joist parameters for the assembled joist 220. As such, in some embodiments web jigs 18 may be used to position the webs members 238; however, in some embodiments the web members 238 are positioned and held in place only by the material handling system 30. As discussed, the joist parameters may comprise minimum joist size, maximum joist size, minimum depth, maximum depth, and maximum or minimum chord length, chord depth, web position and orientation, weld lengths, and/or the like.

In some embodiments, the rigging table system 10, and/or the plurality of upper chord projections 14a, plurality of lower chord projections 14ba, and/or web jigs 18 thereof, comprise stop members (e.g., pneumatic camber induction drives, or the like) structured to provide a hard stop for all chord sizes at reduced operating pressure (e.g., associated with a predetermined safety factor).

The rigging table system 10 further comprises a discharging system 50. Typically, the discharging system 50 comprises plurality of rollers 52 that may be retracted to allow for positioning of the components or members 200 such as chords 222 and webs 238 onto the rigging table system 10, and extended in an upward direction to allow for discharge and transport of an assembled joist 220 after the joining (e.g., welding, or the like) process. In this regard, the discharging system 50 is structured to move the assembled joist 220 after the joining (e.g., welding, or the like) from the rigging table system 10, and/or from the plurality of upper chord projections 14a, plurality of lower chord projections 14ba, and/or web jigs 18 thereof at reduced operating pressure (e.g., associated with a predetermined safety factor).

Welding Systems

As illustrated by FIGS. 1-20, the joist assembly system 1 of the present invention comprises plurality of welding systems 60 that are structured to join, e.g., via welding, the members 200 such as chords 222 and webs 238 positioned on the rigging table system 10. The joining (e.g., welding, or the like) may be performed in accordance with the required joist parameters. The plurality of welding systems 60 may be provided at the first level 96 (e.g., over the support floor 92). Moreover, the plurality of welding systems 60 may comprise a plurality of first welding systems 62 provided proximate the first table side 12a of the rigging table system 10, and plurality of second welding systems 64 provided proximate the second table side 12b of the rigging table system 10. In other words, the rigging table system 10 may be positioned between the plurality of first welding systems 62 and the plurality of second welding systems 64. That said, more or fewer welding systems may be provided. Typically, each of the plurality of welding systems 60 comprise welding arms that are structured to extend over the rigging table system 10 and join (e.g., weld) members 200 such as chords 222 and webs 238 positioned thereon. In some embodiments, the plurality of welding systems 60 may be structured for arc welding, laser welding, brazing, or the like in order to form the joist 220. In other embodiments, the welding system 60 may be joining systems 60 that provide for other joints other than welding, such as riveting, self-taping and/or self-drilling fasteners, other fasteners that are inserted into an aperture, and/or other joining operations to form the joist 220.

Typically, the plurality of welding systems 60 comprise a default retracted position. The plurality of welding systems 60, and/or welding arms thereof, are structured move from the default position to reach side to side to cover a predetermined associated work area (also referred to as a work envelope) thereby moving to a joining position (or a welding position). Here, the plurality of first welding systems 62 may be associated with work areas proximate the first table side 12a of the rigging table system 10, while the plurality of second welding systems 64 may be associated with work areas proximate the second table side 12b of the rigging table system 10. The time for the movement of the plurality of welding systems 60, and/or welding arms thereof from the default position to the joining position may be measured by the controller 450.

In some embodiments, each of the plurality of welding systems 60 may be associated with a maintenance position, such as a torch maintenance position. The plurality of welding systems 60 may be associated with a torch maintenance cycle which may be performed after the joining/welding process is complete. For example, the torch welding maintenance position may be used for cleaning the nozzle of the welding robot between welding of one or more joists 220 (e.g., between each joist, or a run of two or more joists). As such, during or after the joist 220 is discharged from the rigging table system 10, the welding systems 60 move from the joining position and/or a retracted position into a torch maintenance position. In some embodiments the torch maintenance position may occur in the retracted position. In the torch maintenance position, the welding tips of the welding systems 60 may be cleaned (e.g., using wire brushes, cleaning solution, or the like).

Moreover, the plurality of welding systems 60 are collectively structured to reach all the weld locations of the joist 220. In this regard, a minimum reach or range or depth of each of the plurality of welding systems 60 may be around 20 inches. Moreover, the plurality of welding systems 60 are associated to perform the associated joining process such as welding in accordance with joining parameters such as weld depth. In some embodiments, the plurality of welding systems 60 may perform the associated joining process such as welding in accordance with weld criteria such as preventing/minimizing surface bubbles or cracks, maximum allowed undercutting of about 0.03 or 0.03125 inches, preventing/minimizing gouges or nicks, maximum sum of surface piping (porosity) not exceeding $\frac{1}{16}$ inches in any 1 inch of weld, welds not being less than the material thickness for webs less than $\frac{1}{4}$ inch thick, otherwise the weld being the material thickness-$\frac{1}{16}$ inches, the maximum single pass weld being $\frac{5}{16}$ inches, or the like.

Operation of the Joist Assembly System

Figure 1:
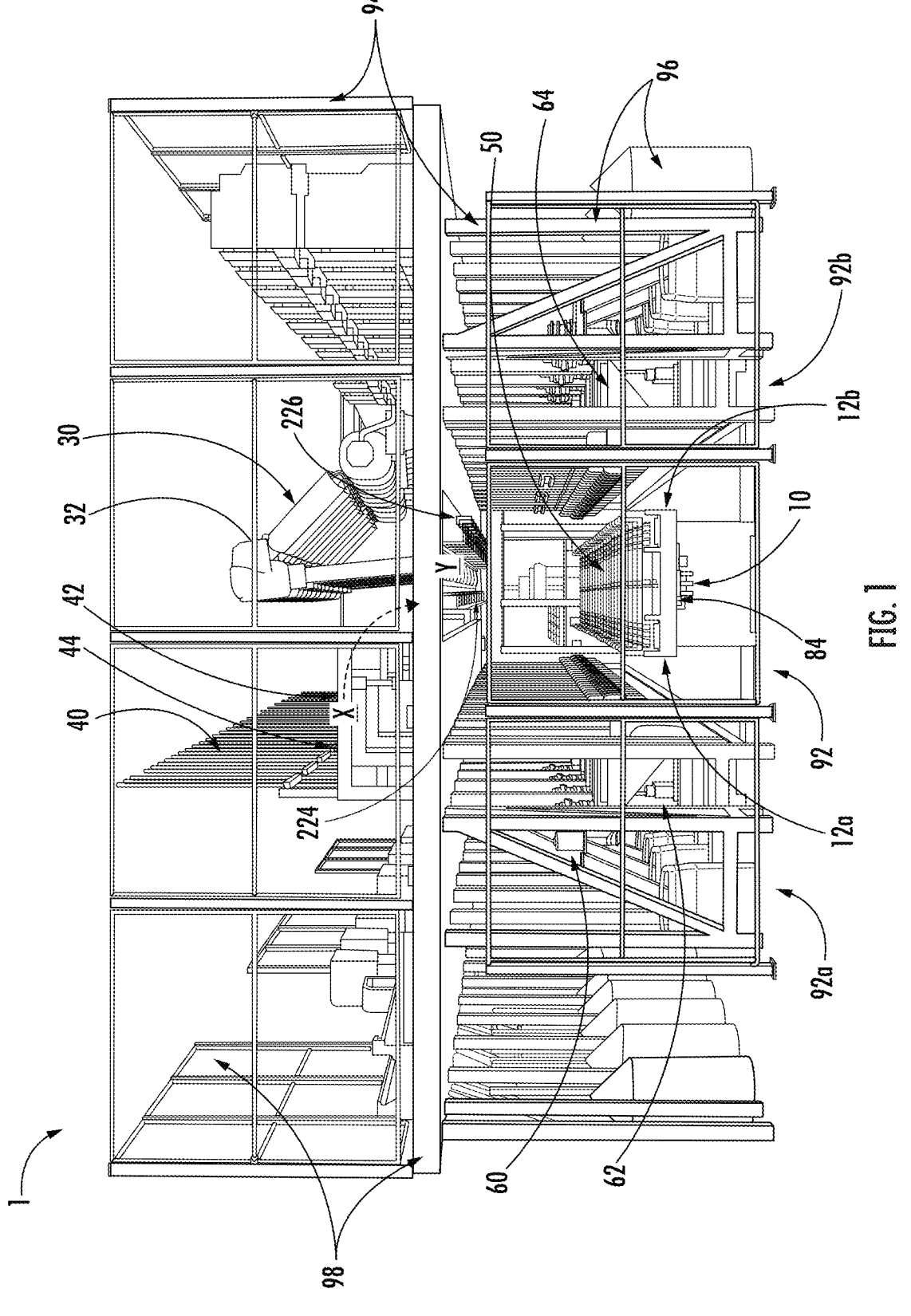
FIG. 1 is a front perspective view of the joist assembly system, in accordance with embodiments of the invention.
Figure 2A:
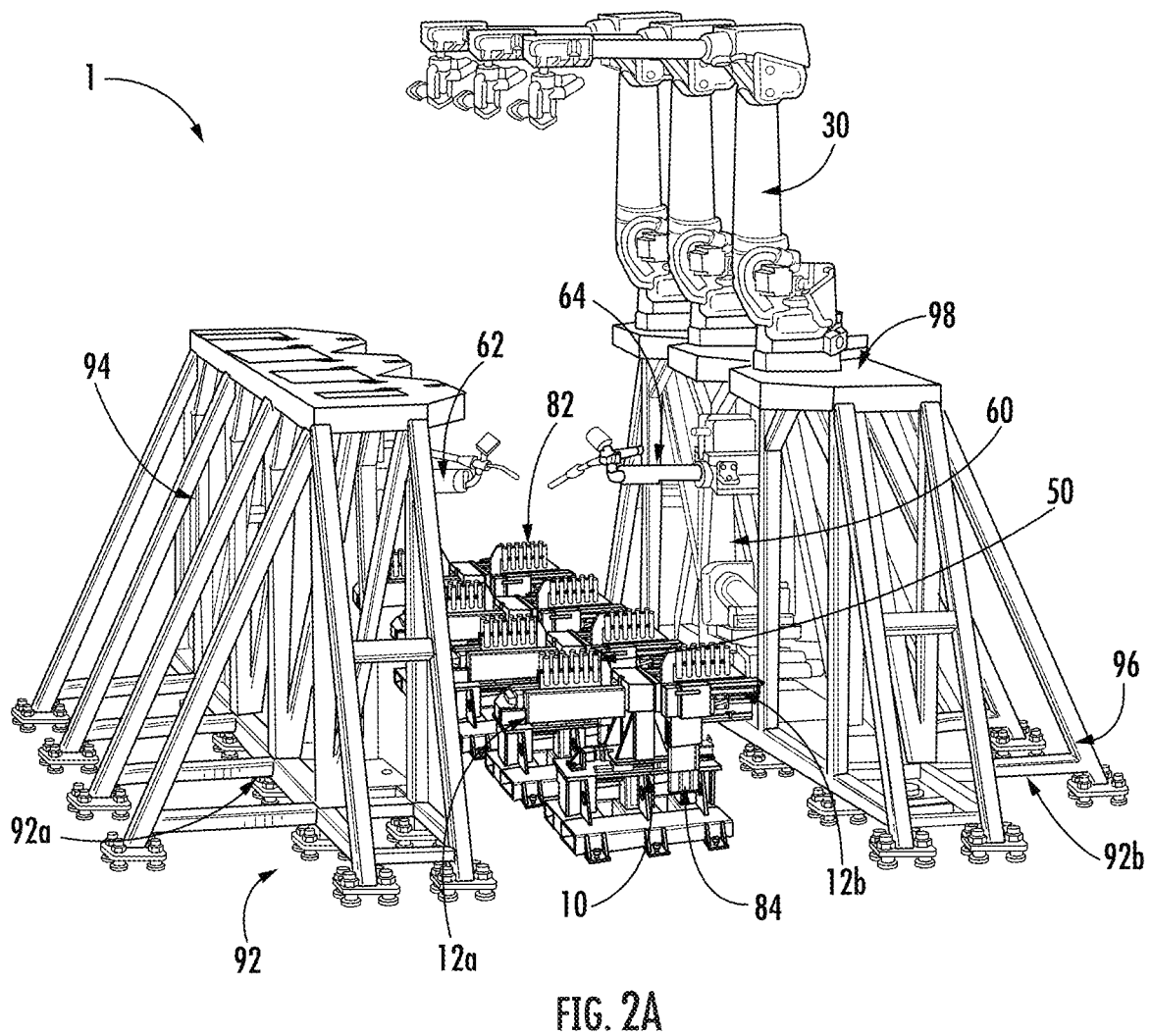
FIG. 2A is a front perspective view of a of the joist assembly system with some of the surrounding structure removed, in accordance with embodiments of the invention.
Figure 2B:
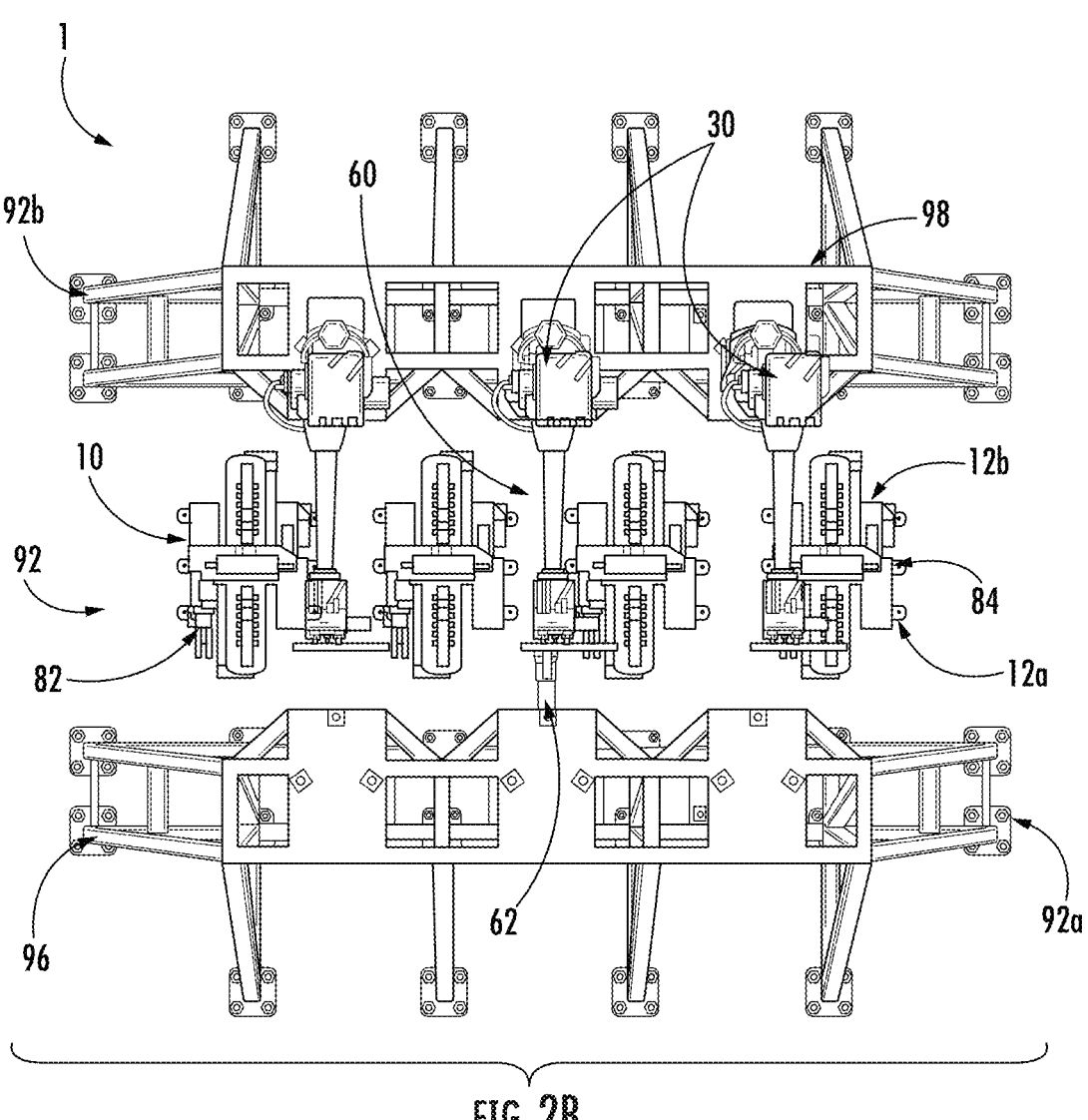
FIG. 2B is a top view of the joist assembly system of FIG. 2A.
Figure 2C:
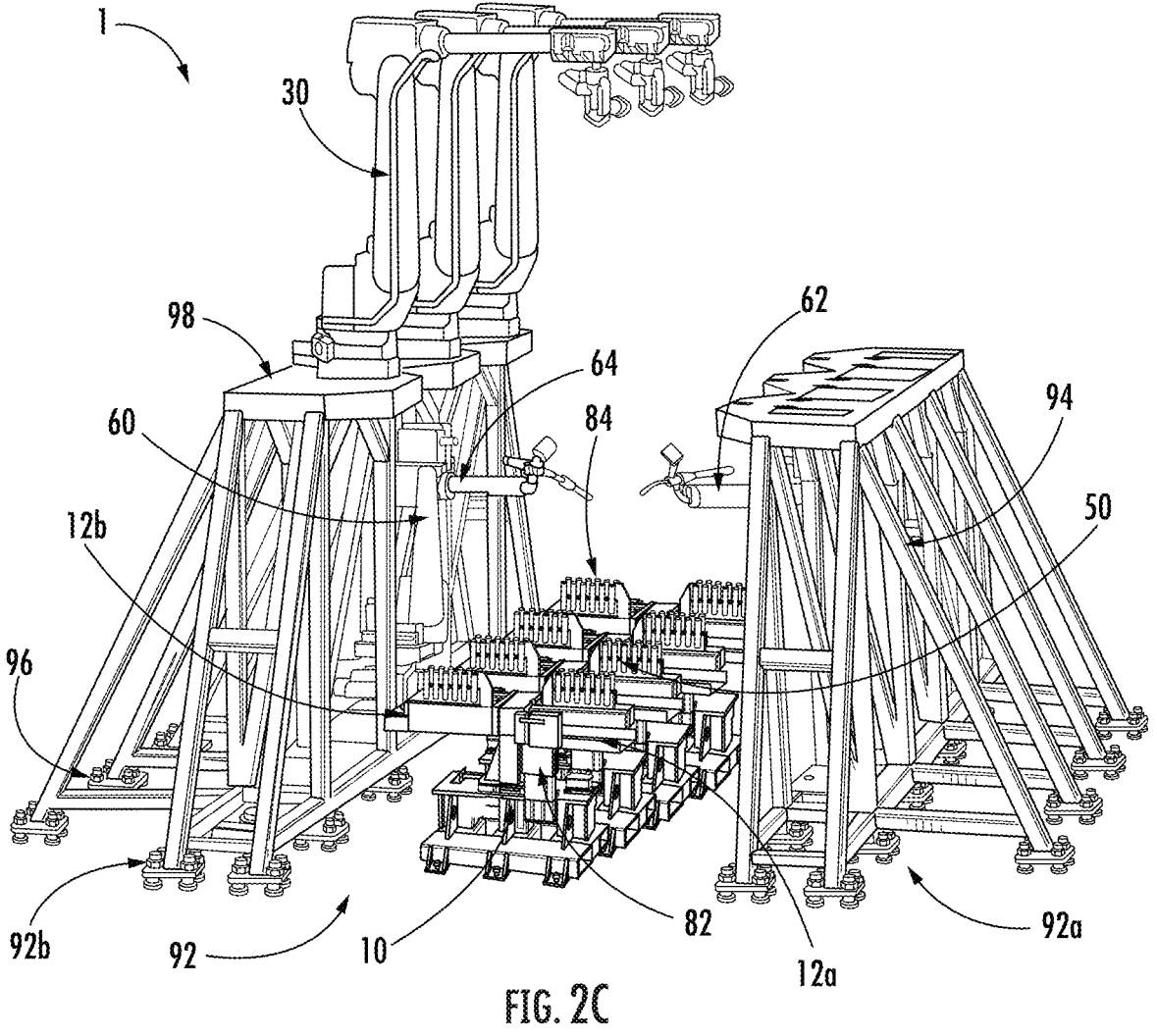
FIG. 2C is a rear perspective view of the joist assembly system of FIG. 2A.
Figure 2D:
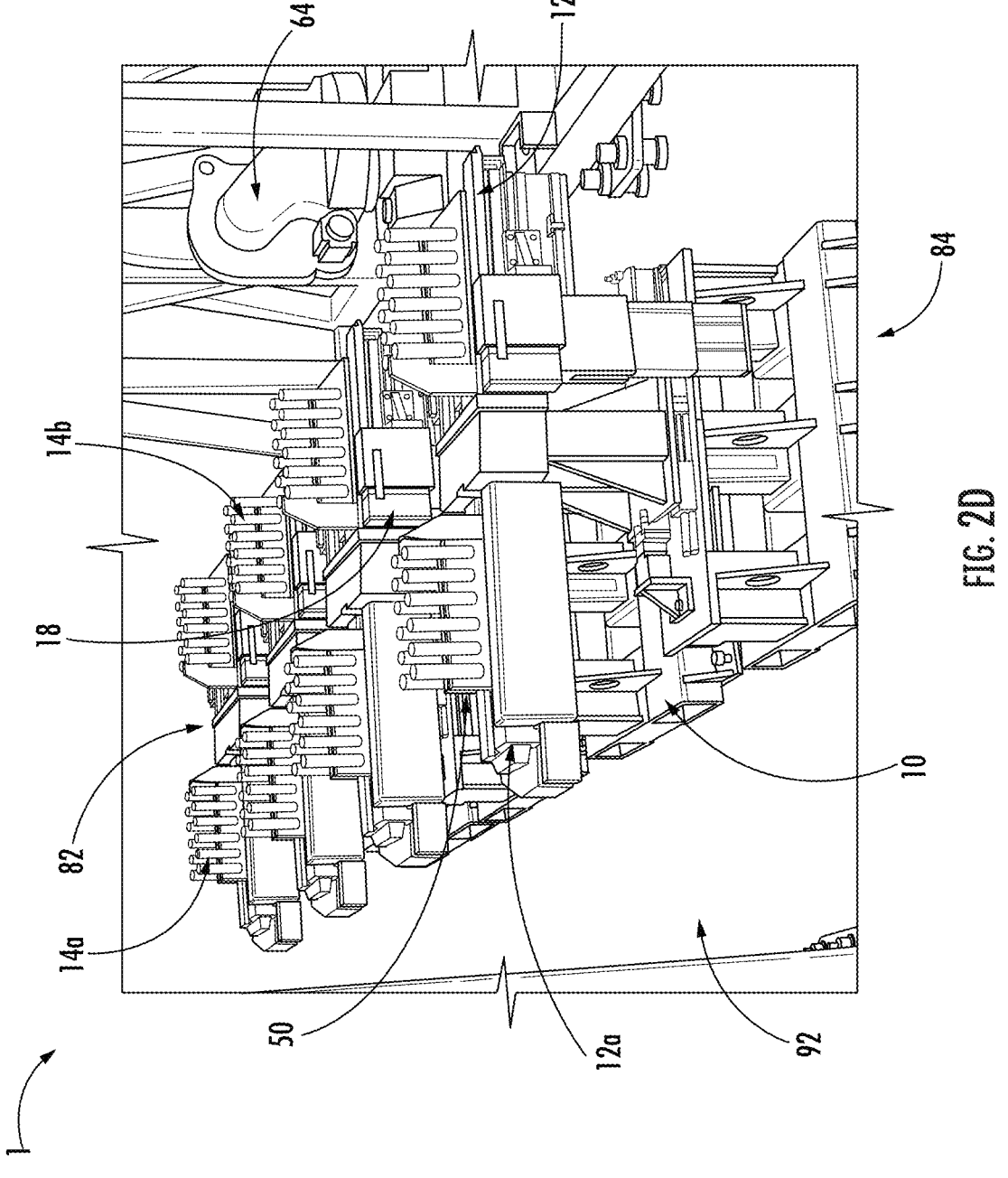
FIG. 2D is a detail view of the rigging table system of the joist assembly system of FIG. 2A.
Figures 3A, 3B:
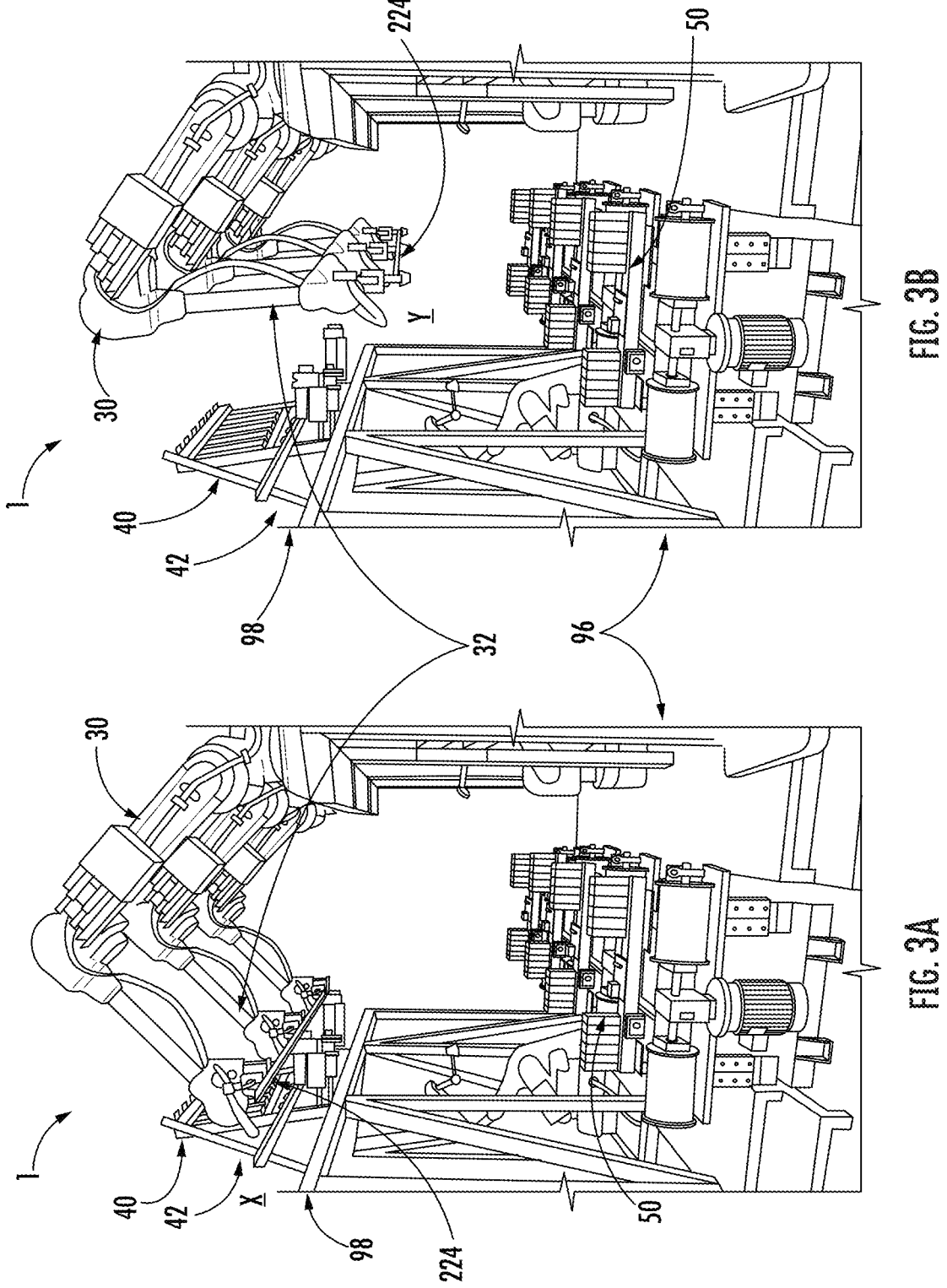
FIG. 3A is a front perspective view of a joist assembly system depicting a retrieval process of chord components, in accordance with embodiments of the invention.
FIG. 3B is a front perspective view the schematic representation of the joist assembly system of FIG. 3A depicting loading process of chord components.

The functioning of the joist assembly system 1 will now be described in detail. Specifically, FIG. 1 illustrates the plurality of chord material handling systems 32 of the plurality of material handling systems 30 loading a first upper chord 224 and a first lower chord 226 from location "X" at a first picking location 42 of the material supply station 40 and transporting it towards the rigging table system 10. FIG. 1 illustrates the first upper chord 224 and the first lower chord 226 at an intermediate position "Y" in between the transport path from the chord supply location X to the rigging table system 10. FIG. 3A illustrates a portion of the plurality of chord material handling systems 32 picking an upper chord 224 from its supply location X at a first picking location 42 of material supply station 40. The plurality of chord material handling systems 32 then transport the upper chord 224 towards the rigging table system 10 as illustrated by FIG. 3B.

Figure 4:
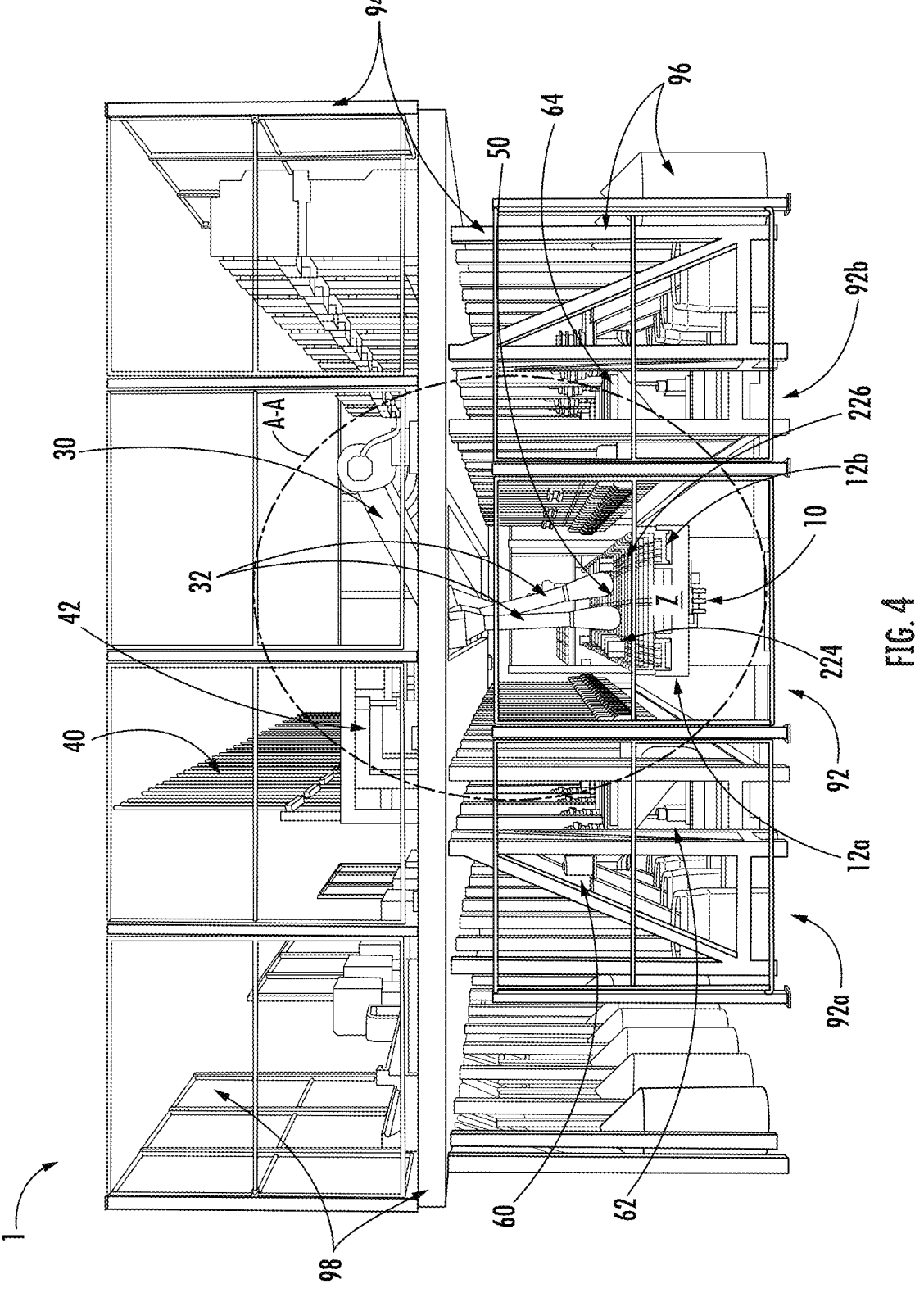
FIG. 4 is a front perspective view of a joist assembly system depicting loading process of chord components onto a rigging table system, in accordance with embodiments of the invention.

The plurality of chord material handling systems 32 may then position the retrieved first upper chord 224 and first lower chord 226 at the rigging table system 10 at an assembly location "Z", as illustrated by FIG. 4. Here, as illustrated, the first upper chord 224 may be positioned proximate the first table side 12a of the rigging table system 10 and the first lower chord 226 may be positioned proximate the second table side 12b of the rigging table system 10, with the first upper chord 224 and the first lower chord 226 being spaced apart by a predetermined distance.

Figures 5A, 5B:
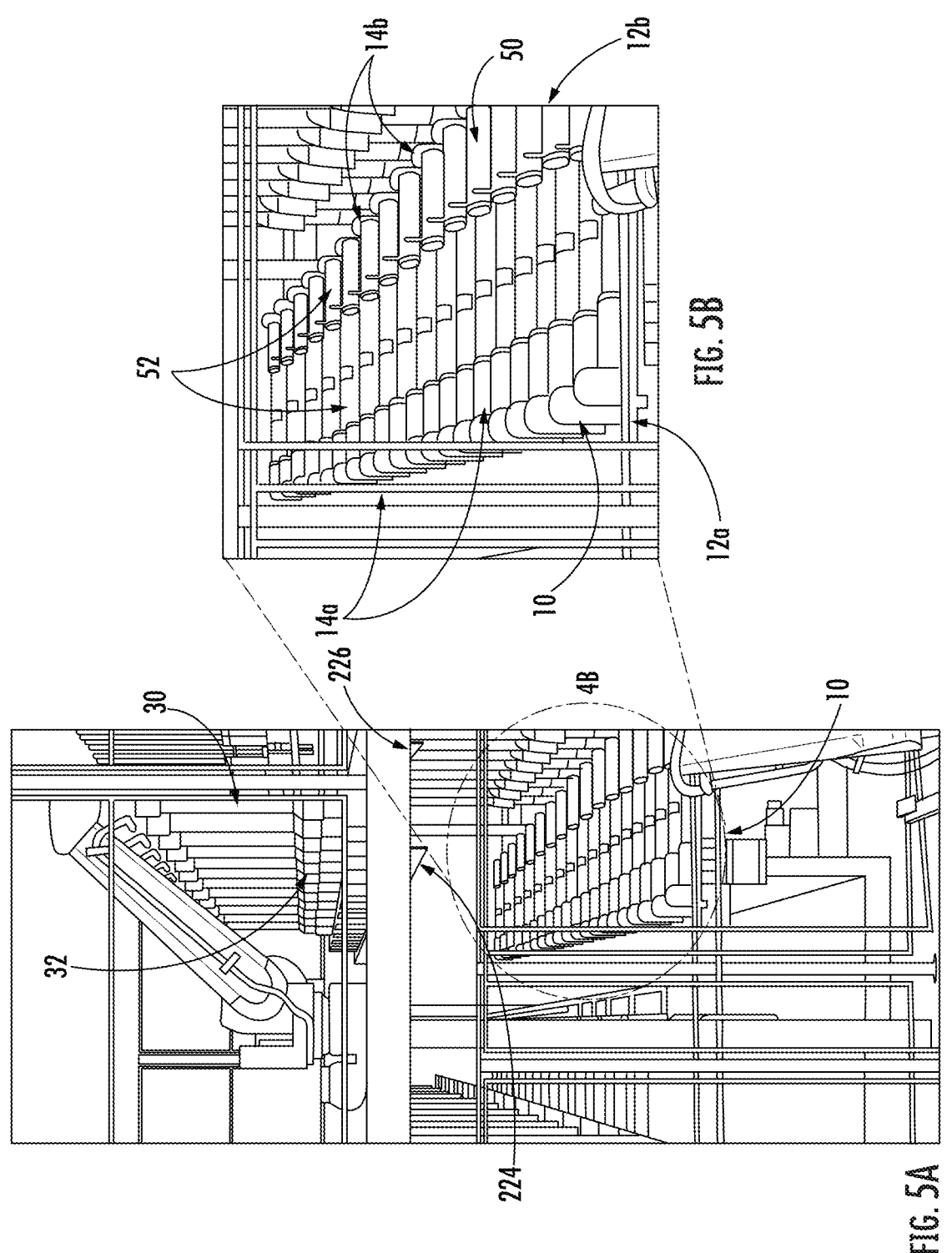
FIG. 5A is a detail view of the joist assembly system of FIG. 4 depicting loading process of chord components onto a rigging table system, in accordance with embodiments of the invention.
FIG. 5B is an enlarged detail view of the joist assembly system of FIG. 5A depicting a detail view of the rigging table system, in accordance with embodiments of the invention.
Figures 6A, 6B:
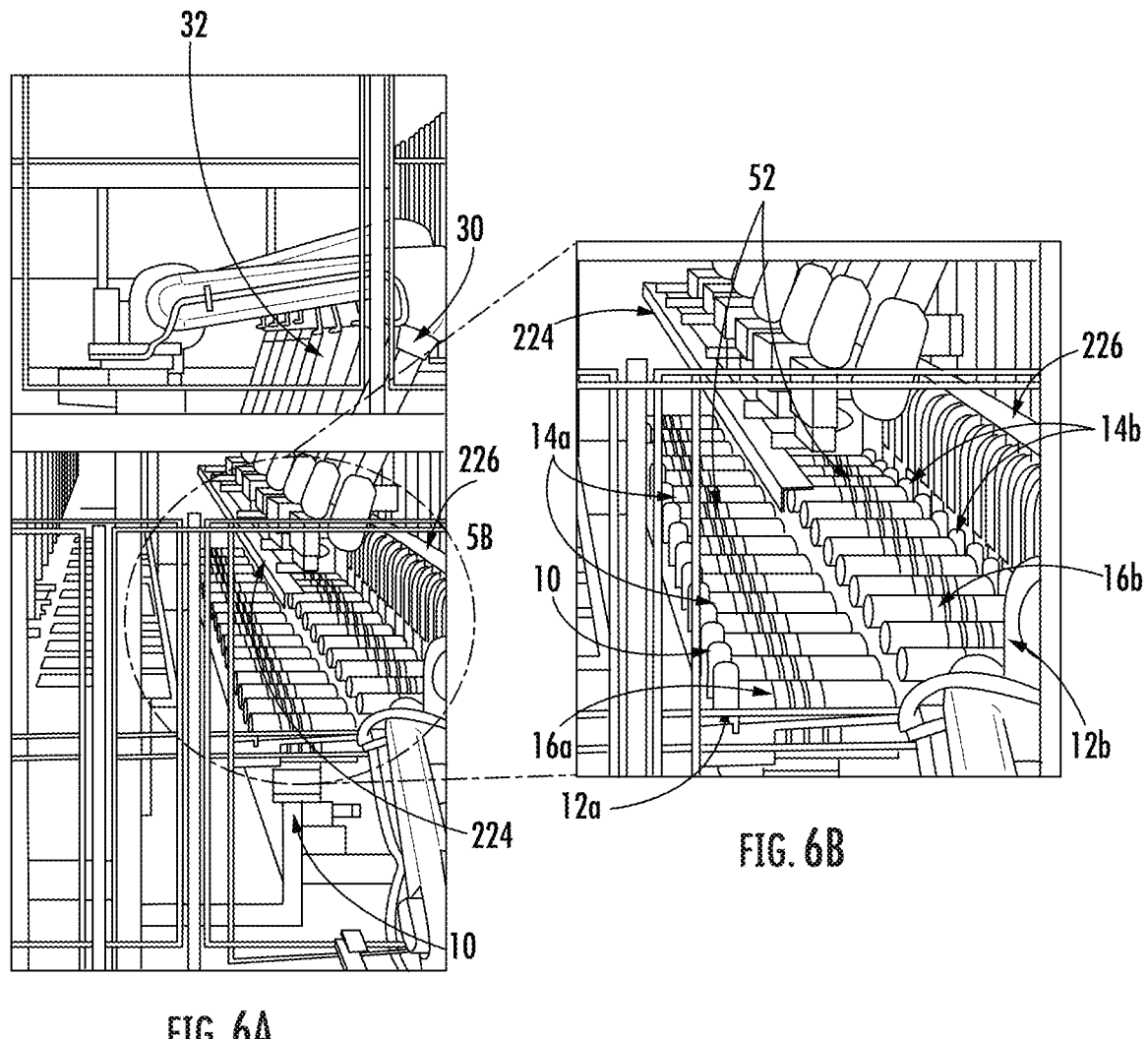
FIG. 6A is a detail view of the joist assembly system of FIG. 4 depicting loading process of chord components onto a rigging table system, in accordance with embodiments of the invention.
FIG. 6B is an enlarged detail view of the joist assembly system of FIG. 6A depicting a detail view of the rigging table system, in accordance with embodiments of the invention.

FIG. 5A illustrates a detail view of the first upper chord 224 and the first lower chord 226 at an intermediate position "Y" in between the transport path from supply location X to the rigging table system 10. As illustrated by FIG. 5B, before and/or during the transport of the chords 222 towards the rigging table system 10, the plurality of rollers 52 of the discharging system 50 may be in an extended position from a preceding discharge cycle from a discharge/transport of a prior assembled joist out of the rigging table system 10. Next, as illustrated by FIGS. 6A and 6B, as the plurality of chord material handling systems 32 move the first upper chord 224 and the first lower chord 226 from the intermediate position Y towards the rigging table system 10, the plurality of rollers 52 retract, allowing for positioning of the chords and other elements required for the next assembly cycle. FIGS. 5A-6B further illustrate chord projections (14a, 14b) and chord cavities (16a. 16b) provided at the rigging table system 10.

Figure 7A:
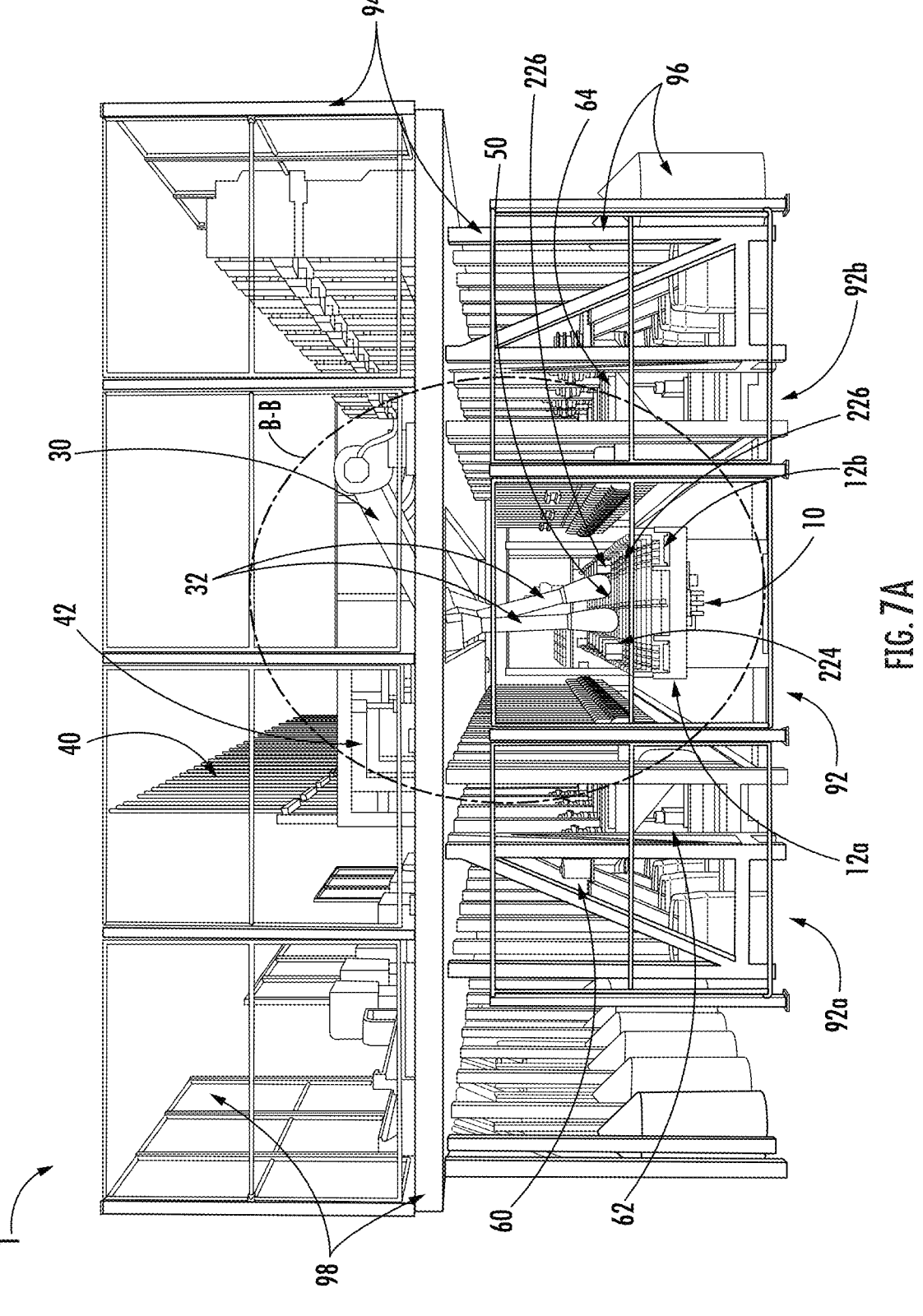
FIG. 7A is a front perspective view of a joist assembly system depicting loading process of chord components onto a rigging table system, in accordance with embodiments of the invention.
Figure 7B:
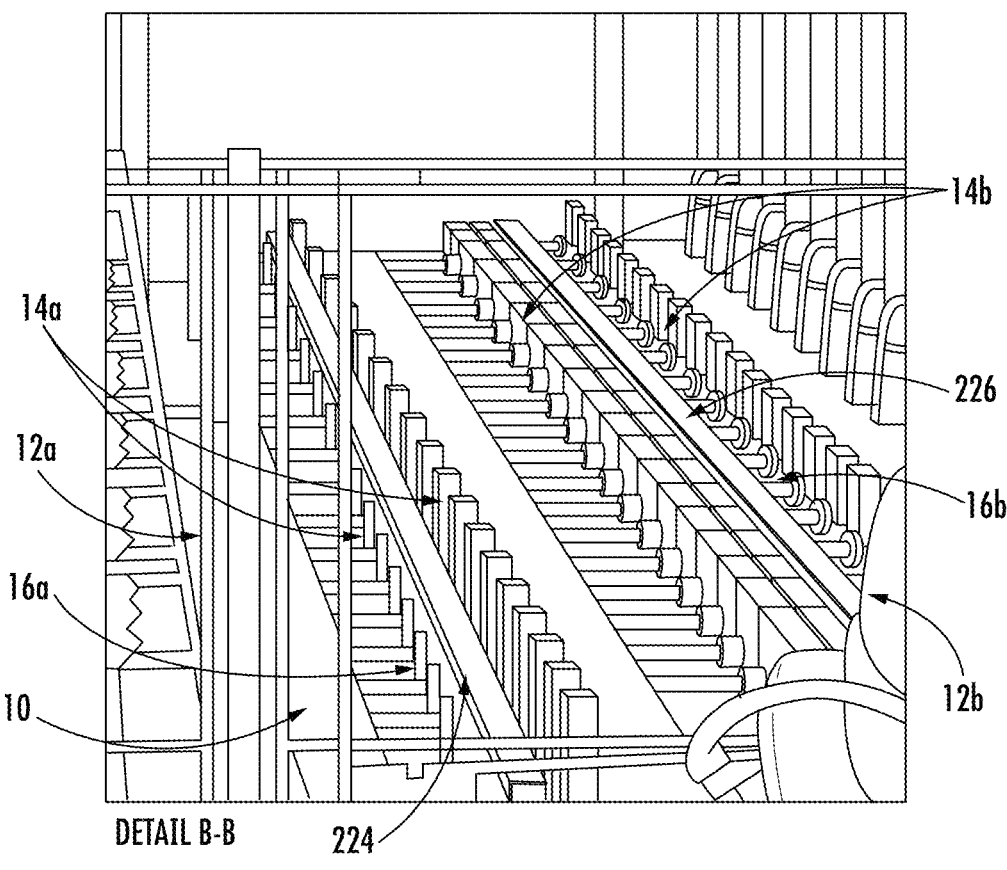
FIG. 7B is an enlarged view of the joist assembly system of FIG. 7A depicting loading process of chord components onto the rigging table system, in accordance with embodiments of the invention.
Figure 8:
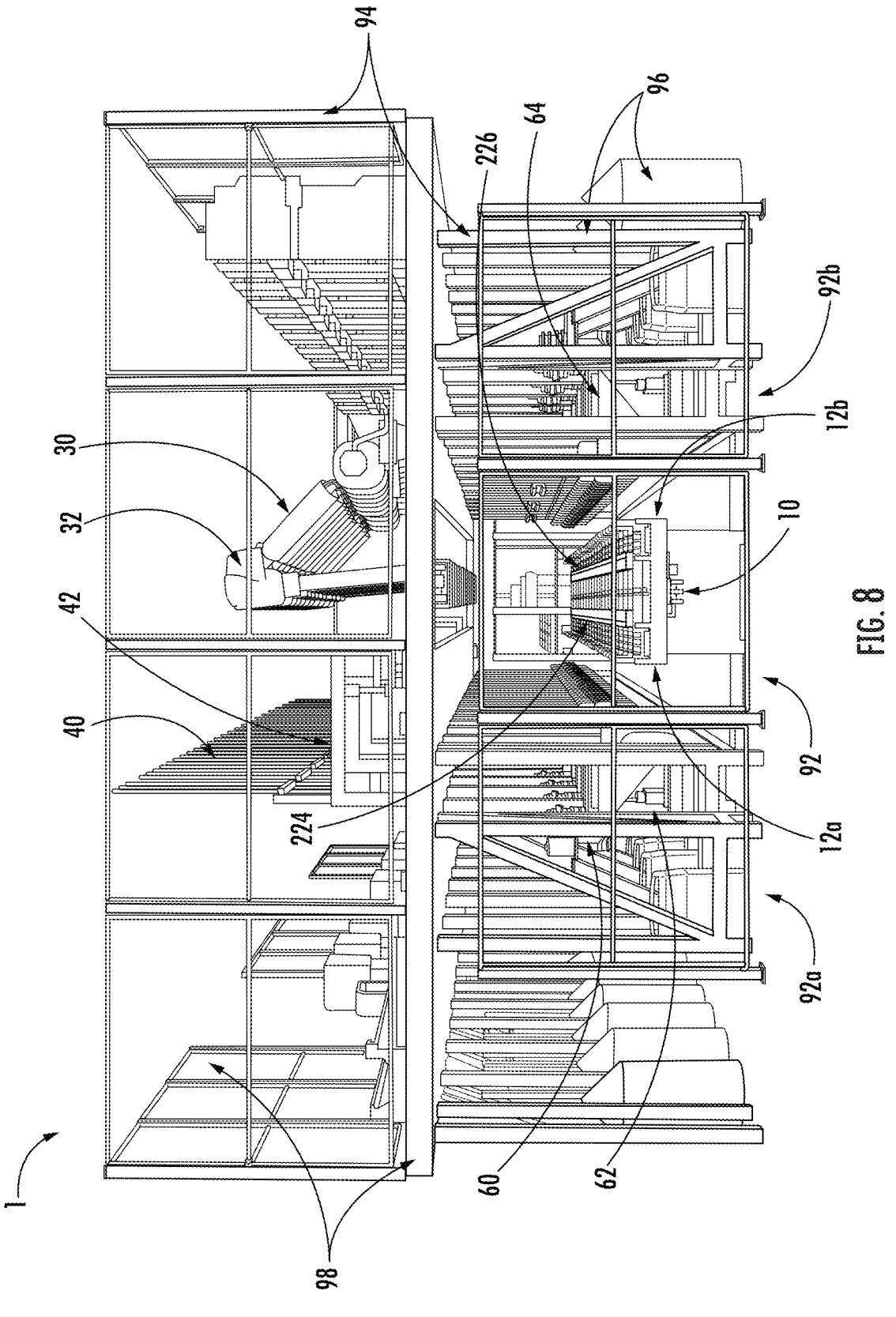
FIG. 8 is a front perspective view of a joist assembly system with the material handling systems being retracted, in accordance with embodiments of the invention.

Next, plurality of chord material handling systems 32 load the first upper chord 224 and the first lower chord 226 at the rigging table system 10 as illustrated by FIG. 7A. As depicted by the detail view of FIG. 7B, the first upper chord 224 is positioned at the plurality of upper chord projections 14a such that first upper chord portion 224a is at least partially within the plurality of upper chord cavities 16a. In other words, the first upper chord 224 is held in place and supported by the plurality of upper chord projections 14a in conjunction with the plurality of upper chord cavities 16a. Moreover, the first lower chord 226 is positioned at the plurality of lower chord projections 14b such that first lower chord portion 226a is at least partially within plurality of lower chord projections 14b. In other words, the first lower chord 226 is held in place and supported by the plurality of lower chord projections 14b in conjunction with the plurality of lower chord cavities 16b. Subsequently, the plurality of chord material handling systems 32 of the plurality of material handling systems 30 may retract away from the rigging table system 10 as illustrated by FIG. 8. In some embodiments, one or more retaining members (e.g., clamps, fingers, or the like) may actuate to restrict the movement of the chords 222 (e.g., clamp the chords in place).

Figure 9:
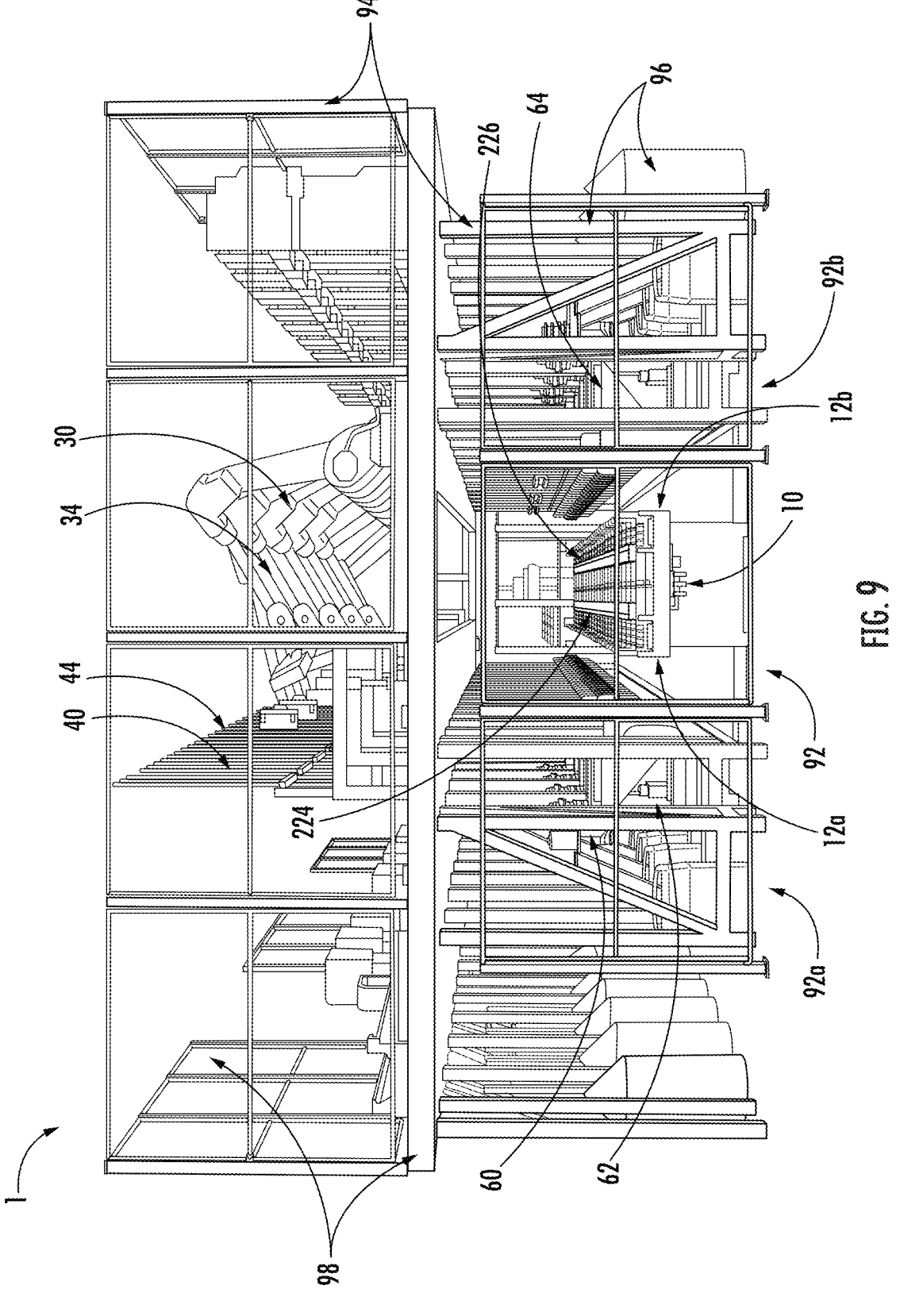
FIG. 9 is a front perspective view of a joist assembly system depicting retrieval process of web components, in accordance with embodiments of the invention.
Figure 10:
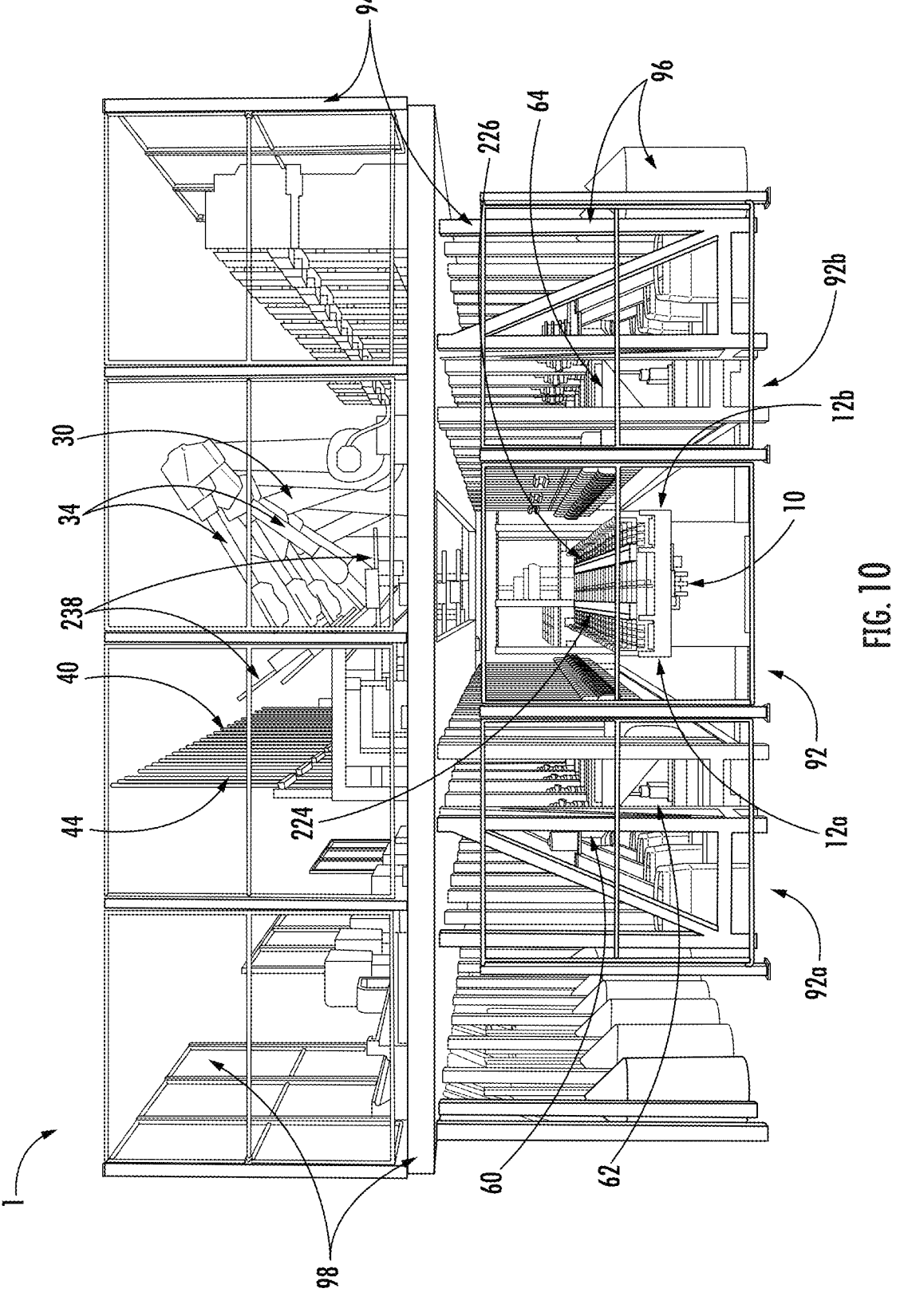
FIG. 10 is a front perspective view of a joist assembly system depicting loading process of web components, in accordance with embodiments of the invention.

Next, the plurality of material handling systems 30 may load (e.g., retrieve, transport, position, or the like) a first set of web members 238 from the material supply station 40. In this regard, FIG. 9 illustrates the plurality of web material handling systems 34 grip a first set of web members 238 at second picking location 44 of the material supply station 40. Next, FIG. 10 illustrates the plurality of web material handling systems 34 retracting from the material supply station 40, thereby transporting the first set of web members 238 towards the rigging table system 10. In some embodiments, the plurality of web material handling systems 34 may turn, rotate, and/or otherwise orient the web members 238 in accordance with the required structure of the joist 222, while the web members 238 are being transported towards the rigging table system 10.

Figure 11A:
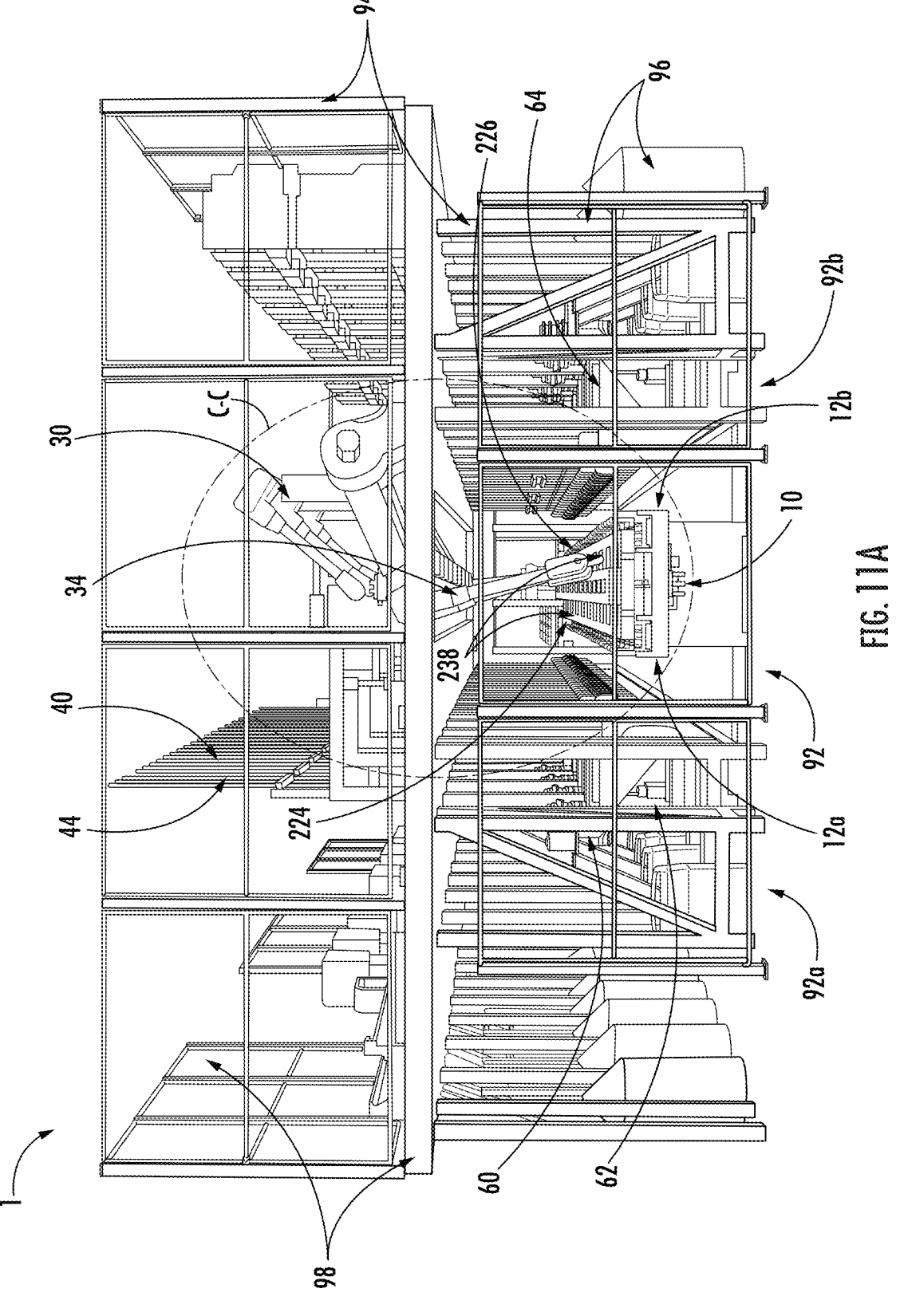
FIG. 11A is a front perspective view of a joist assembly system depicting loading process of web components onto a rigging table system, in accordance with embodiments of the invention.
Figure 11B:
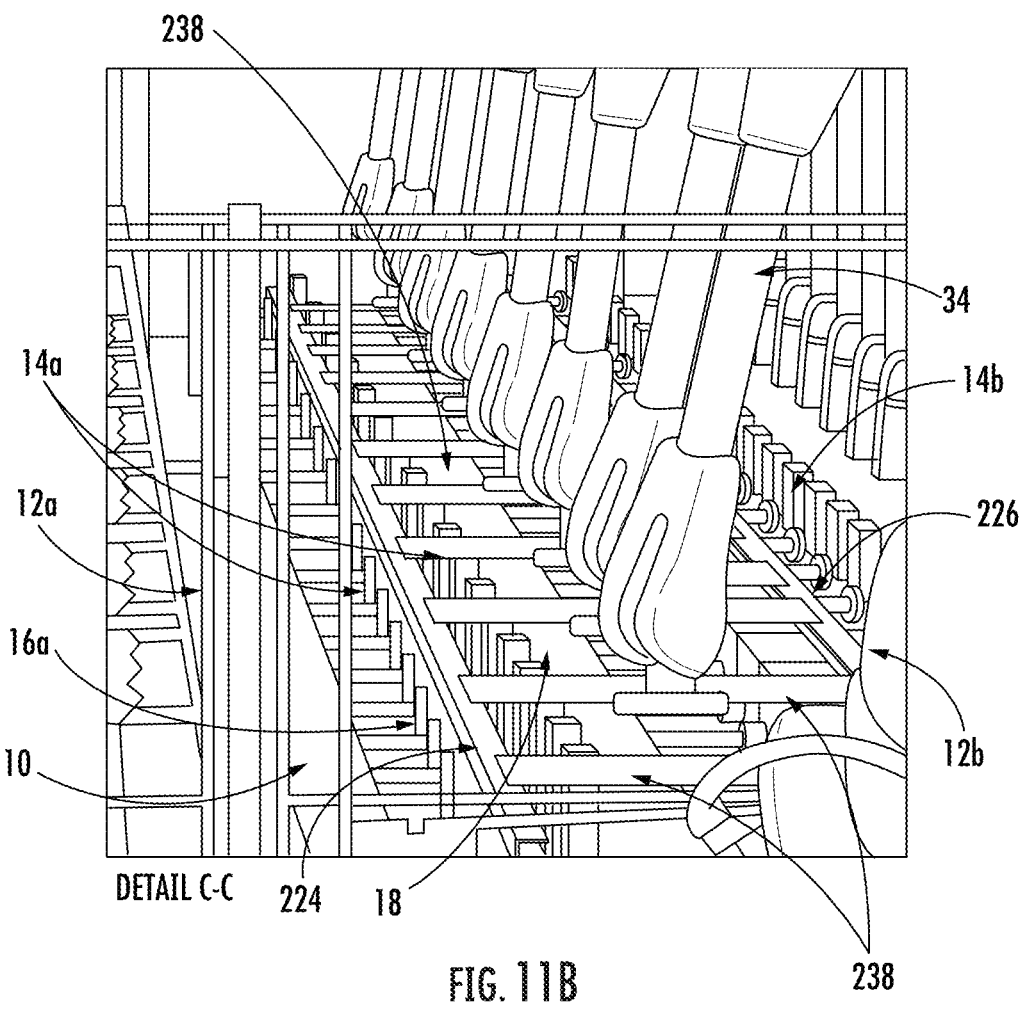
FIG. 11B is an enlarged view of the joist assembly system of FIG. 11A depicting loading process of web components onto the rigging table system, in accordance with embodiments of the invention.

Next, the plurality of web material handling systems 34 position the first set of web members 238 at the rigging table system 10 between the already positioned first upper chord 224 and first lower chord 226, as illustrated by FIG. 11A. As depicted by the detail view of FIG. 11B, the first set of web members 238 are positioned by the web material handling systems 34 (e.g., with our without web jigs 18) at a predetermined position, angle, spacing, and/or the like in accordance with the required structure of the joist 220. Moreover, the web members 238 may be positioned relative to the upper chord 224 and lower chord 226 such that each of the web members 238 forms at least one joining location (e.g., welding location) with the upper chord 224 and/or the lower chord 226. Here, at least a portion of each end of each of the web members 238 may be positioned to be proximate (e.g., contact, overlap, or the like) an adjacent portion of the upper chord 224 and/or the lower chord 226 to thereby form the joining location(s) to facilitate joining (e.g., welding) of the pair of the web member 238 and the corresponding the upper chord 224 and/or the lower chord 226 at the joining locations.

Figure 12A:
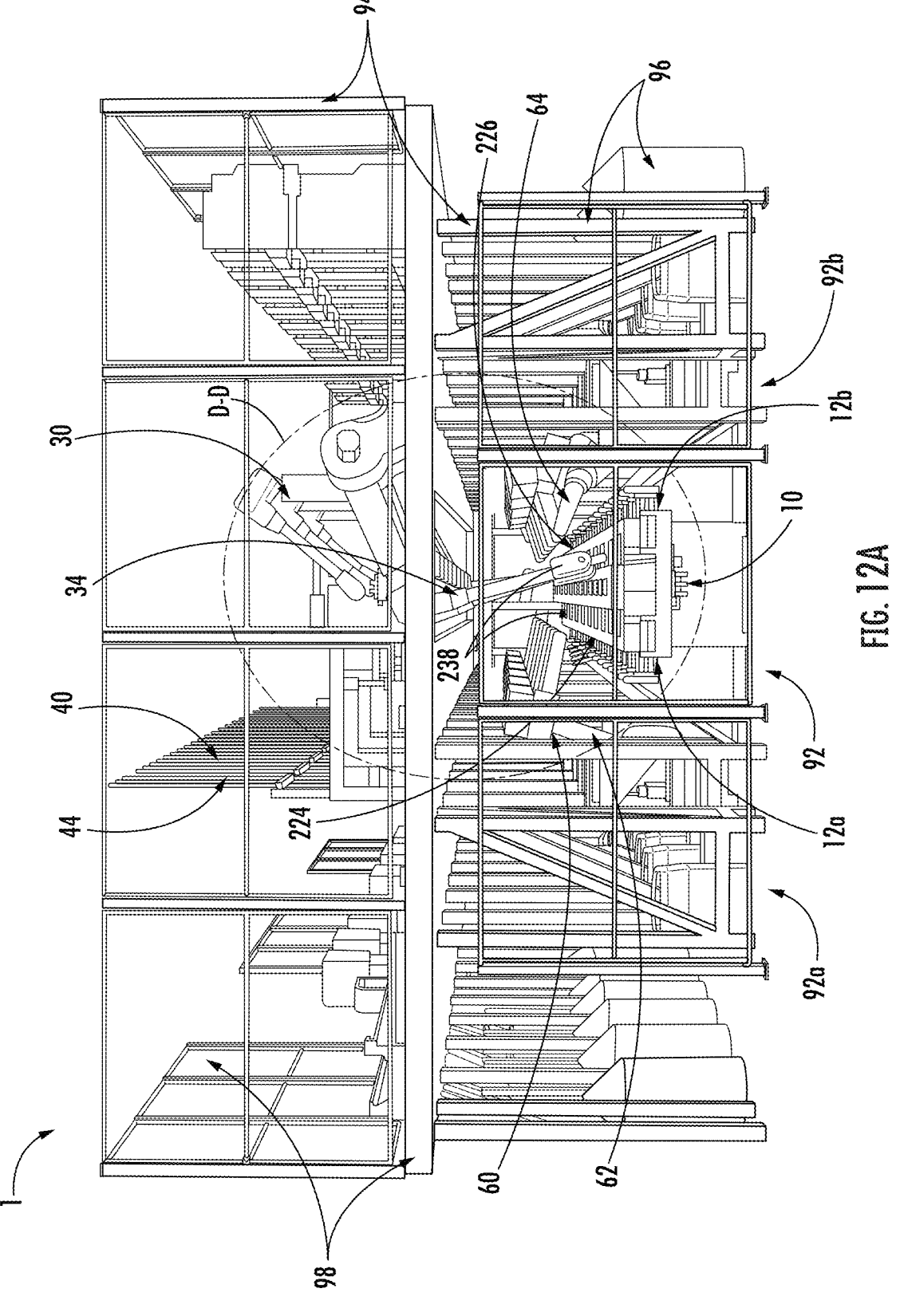
FIG. 12A is a front perspective view of a joist assembly system depicting joining process of components at a rigging table system, in accordance with embodiments of the invention.
Figure 12B:
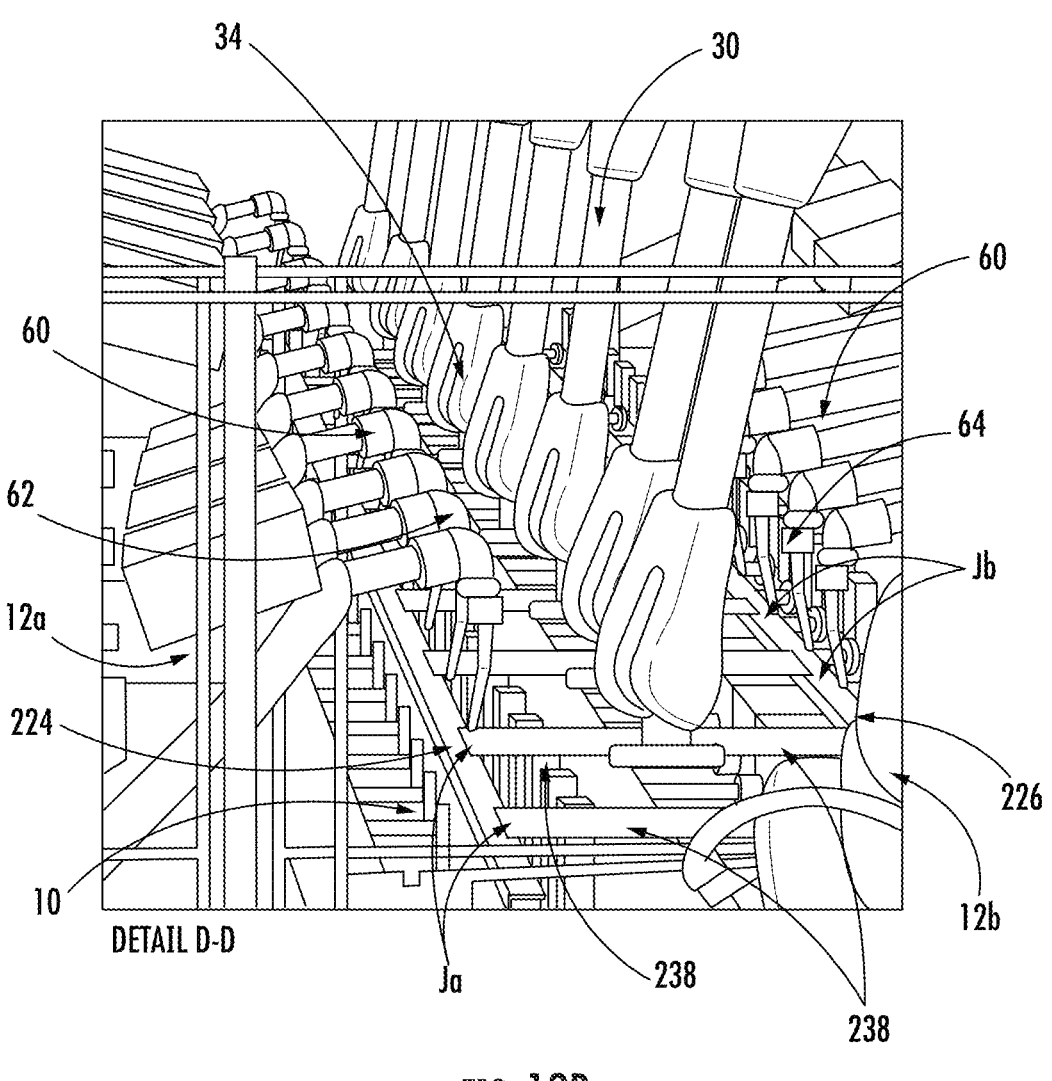
FIG. 12B is an enlarged view of a joist assembly system of FIG. 12A depicting joining process of components at a rigging table system, in accordance with embodiments of the invention.

Next, the plurality of welding systems 60 may move from their default retracted position to a joining position, (e.g., extend to move over a cover a predetermined associated work area, also referred to as a work envelope) over the rigging table system 10, as illustrated by FIG. 12A. The plurality of web material handling systems 34 may hold or maintain the web members 238 and/or the upper chord 224 and/or the lower chord 226 in their correct position (e.g., location, orientation, pressure, or the like) while the plurality of welding systems 60 join (e.g., weld) the components or members 200 together, thereby precluding any undesirable displacement during the joining process. As such, the plurality of web material handling systems 34 may apply a predetermined downward force onto the web members 238 and/or the upper chord 224 and/or the lower chord 226 in their correct position over the rigging table system 10 during the joining process. Moreover, as illustrated by the detail view of FIG. 12B, the plurality of first welding systems 62 may join (e.g., weld) joint locations Ja between the upper chord 224 and corresponding ends of the web members 238, while the plurality of second welding systems 64 may join (e.g., weld) the lower chord 226 and corresponding ends of the web members 238 at the joining locations Jb. The plurality of first welding systems 62 and plurality of second welding systems 64 may subsequently move back to the default retracted positions.

Figure 13:
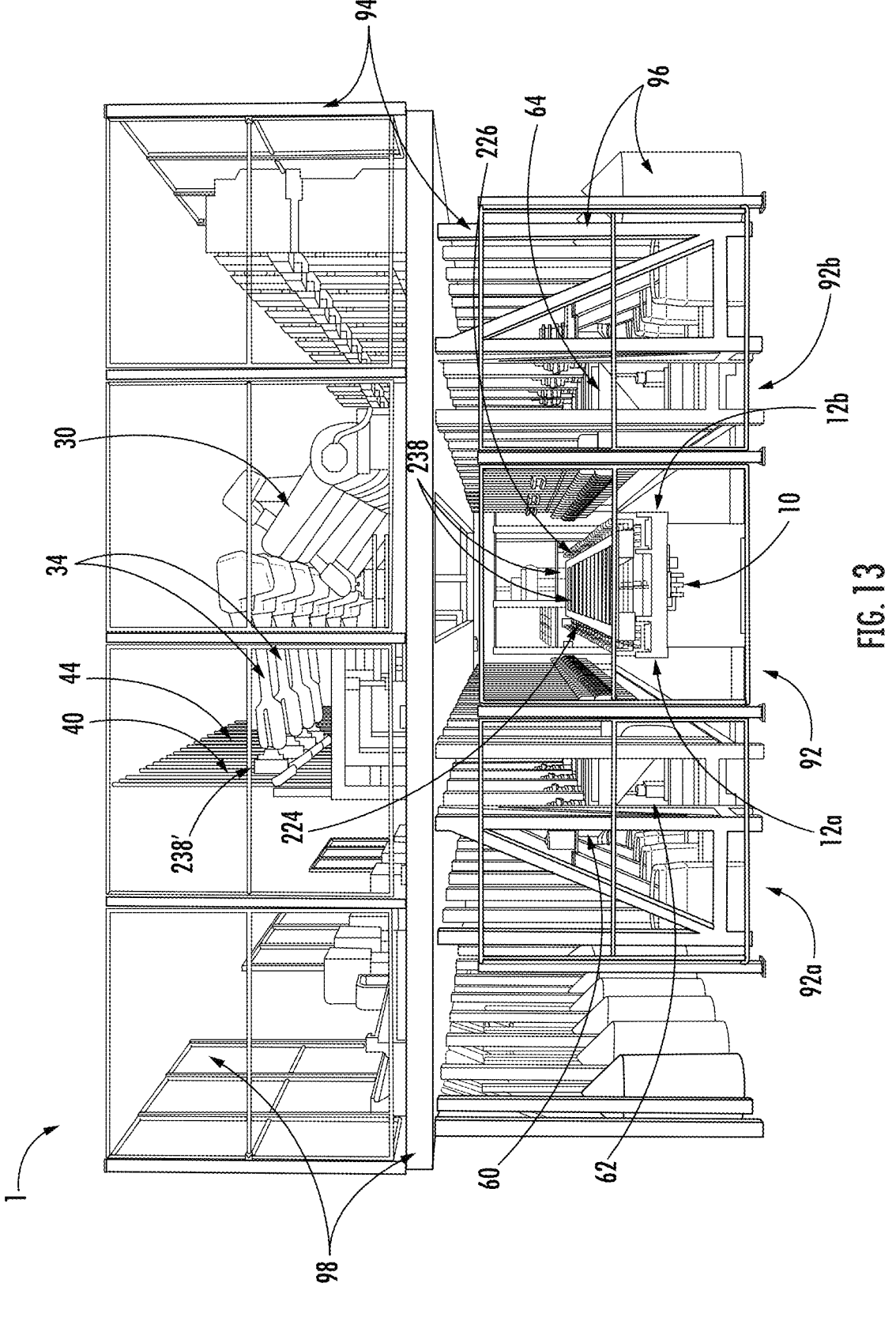
FIG. 13 is a front perspective view of a joist assembly system depicting retrieval process of additional web components, in accordance with embodiments of the invention.
Figure 14:
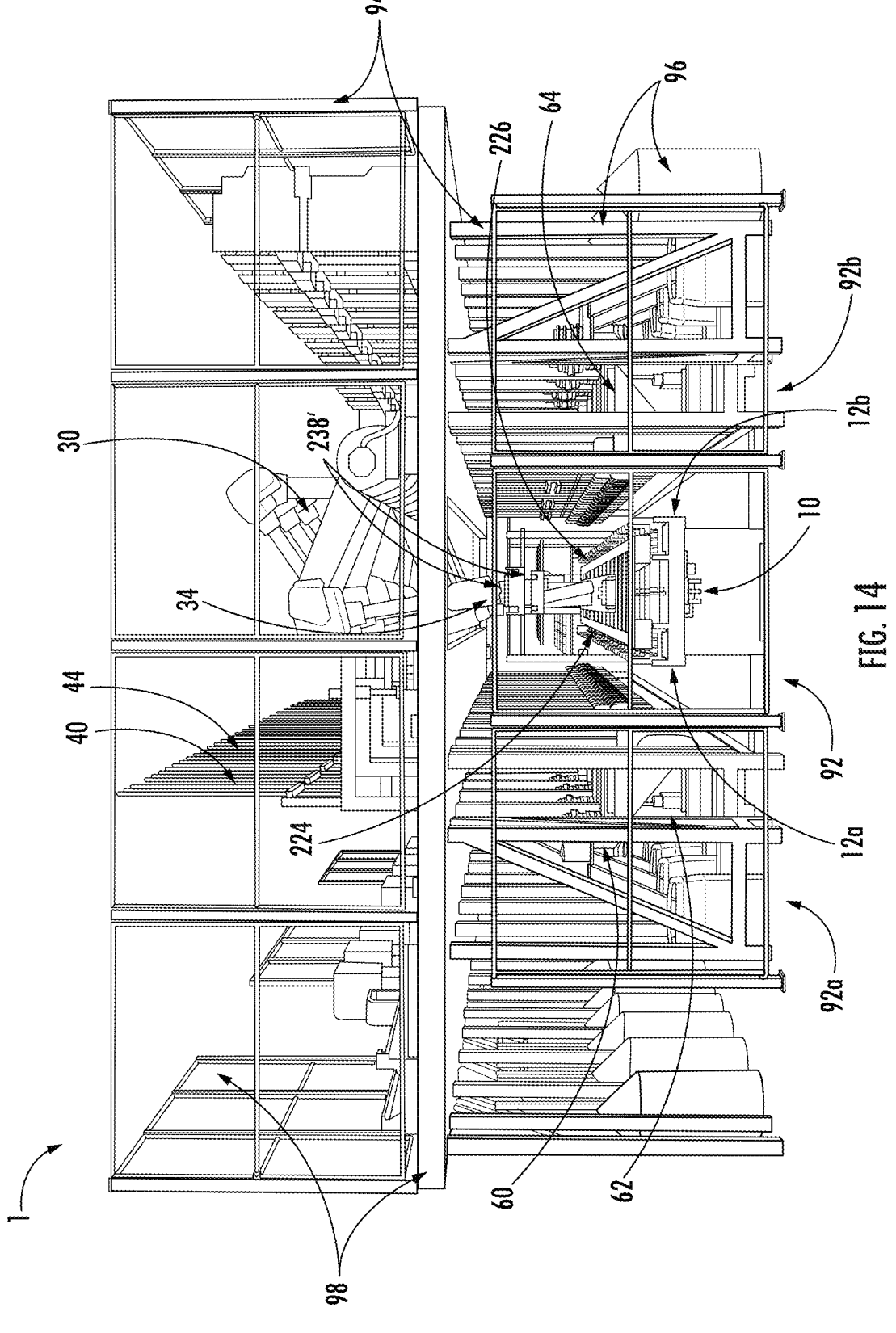
FIG. 14 is a front perspective view of a joist assembly system depicting loading process of additional web components, in accordance with embodiments of the invention.
Figure 15:
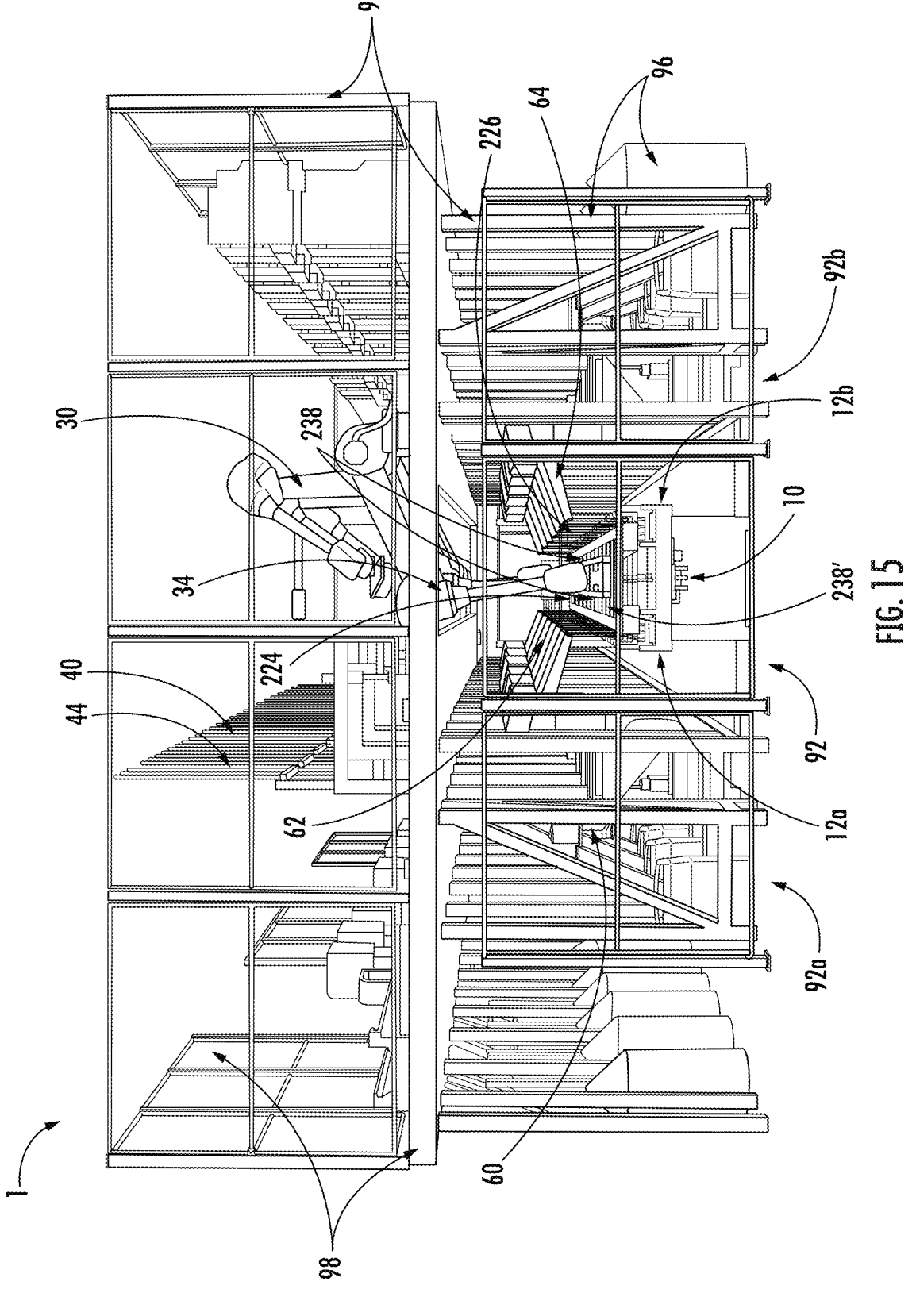
FIG. 15 is a front perspective view of a joist assembly system depicting joining process of additional web components at a rigging table system, in accordance with embodiments of the invention.

Next, the plurality of web material handling systems 34 may retract and move towards the material supply station 40 to load a second set of web members 238' from the material supply station 40. In this regard, FIG. 13 illustrates the plurality of web material handling systems 34 grip a second set of web members 238' at the second picking location 44 of the material supply station 40. Next, FIG. 14 illustrates the plurality of web material handling systems 34 transporting the second set of web members 238' towards the rigging table system 10. In some embodiments, the plurality of web material handling systems 34 may turn, rotate, and/or otherwise orient) the web members 238' in accordance with the required structure of the joist, while the web members 238' are being transported towards the rigging table system 10. Next, the plurality of web material handling systems 34 position the second set of web members 238' at the rigging table system 10 between the already positioned first upper chord 224 and first lower chord 226 and adjacent already positioned first set of web members 238, as illustrated by FIG. 15. The second set of web members 238' may also be positioned (e.g., with our without web jigs 18) at a predetermined position, angle, spacing, and/or the like in accordance with the required structure of the joist. Moreover, the web members 238' may be positioned relative to (i) the upper chord 224 and lower chord 226, and/or (ii) the first set of web members 238 such that each of the web members 238' forms at least one joining location with the upper chord 224 and/or the lower chord 226 and/or a web member of the first set of web members 238. Here, at least a portion of each end of each of the web members 238' may be positioned to be proximate (e.g., contact, overlap, or the like) an adjacent portion of the upper chord 224 and/or the lower chord 226 to thereby form the joining location(s) to facilitate joining (e.g., welding) of the pair of the web member 238' and the corresponding the upper chord 224 and/or the lower chord 226 at the joining position. Moreover, the second set of web members 238' may similarly form joining locations with the first set of web members 238.

Figure 16:
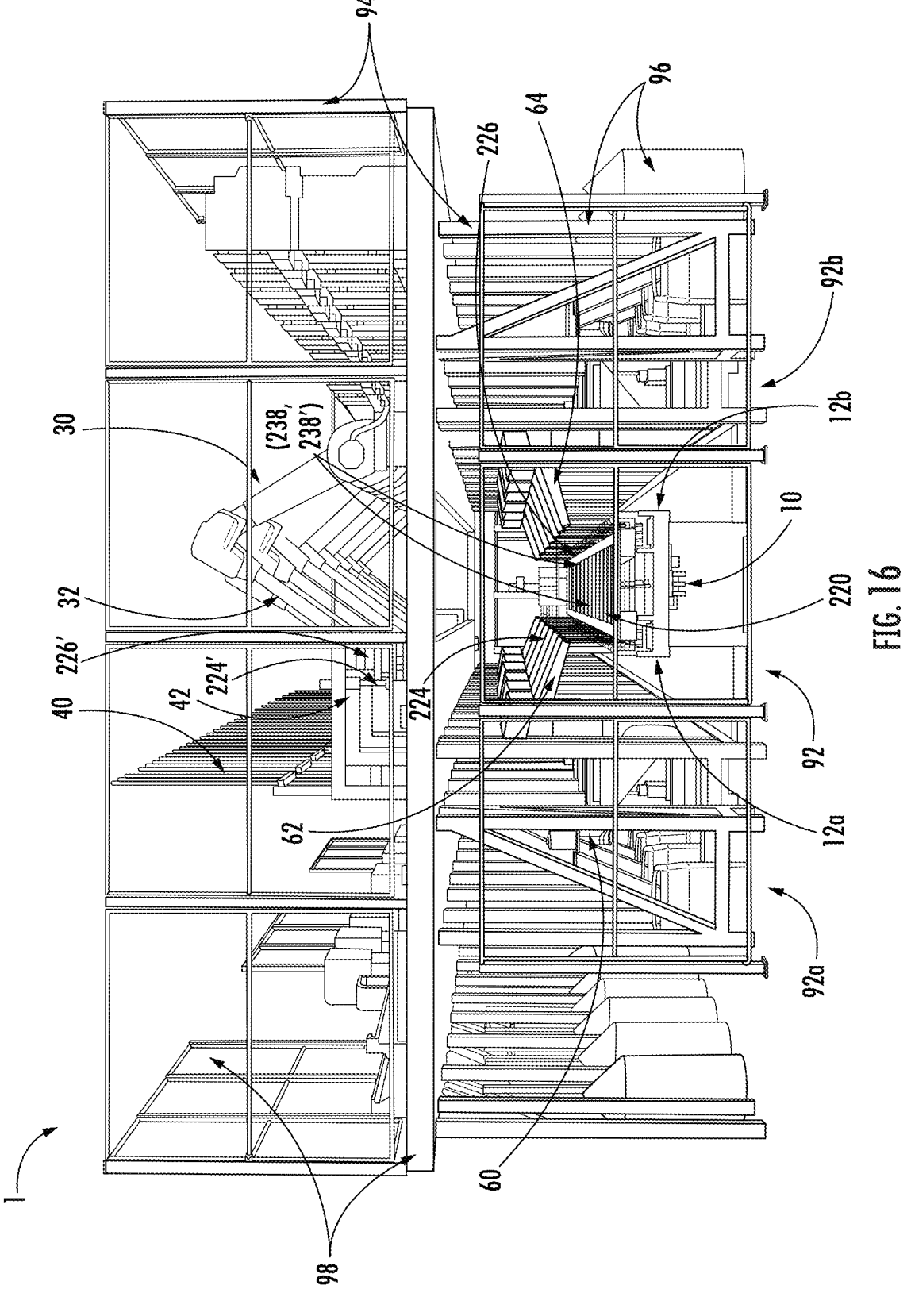
FIG. 16 is a front perspective view of a joist assembly system depicting retrieval process of additional chord components, in accordance with embodiments of the invention.

Next, the plurality of welding systems 60 may move from their default retracted position to a joining position (e.g., extend to move over a cover a predetermined associated work area, also referred to as a work envelope) over the rigging table system 10, as illustrated by FIGS. 15 and 16. The plurality of first welding systems 62 and plurality of second welding systems 64 may join (e.g., weld) the second set of web members 238' to the upper chord 224, lower chord 226, and/or the first set of web members 238. The plurality of web material handling systems 34 may hold or maintain the second set of web members 238' in their correct position (e.g., location, orientation, pressure, or the like) while the plurality of welding systems 60 join (e.g., weld) the components or members 200 together, thereby precluding any undesirable displacement during the joining process. As such, the plurality of web material handling systems 34 may apply a predetermined downward force onto the second set of web members 238' in their correct position over the rigging table system 10 during the joining process.

It should be understood that in some embodiments, a third set of web members 238" (e.g., vertical web members when the joist is installed) are loaded and joined as previously described with respect to the first set of web members and second set of web members (e.g., diagonal webs members when the joist is installed). In some embodiments, during the welding process the material handling systems 30 (e.g., the web material handling systems 34) may only hold the web members 238 long enough to be tack welded (e.g., a 1, 2, 3, 4, 5, or the like millimeters of weld) such that the web members 238 cannot move with respect to the chords members 222. After the members are tack welded, the material handling systems 30 (e.g., the chord material handling systems 34) may release the web member 238 in order to return to the second picking location 44 in order to load more webs. As the same time, the welding systems 60 continue to weld the webs 238 to the chords 222 after the tack welding.

It should be further understood that one or more sensors may be used throughout the joist assembly system 1. The sensors may be any type of sensor that is used for various purposes, such as but not limited to checking the size and/or position of the chords 222 and/or webs 238, checking the welds on the joists 220, checking the location of the devices within the joist assembly system 1, identifying foreign objects (e.g., people, members that should not be present, or the like) in the joist assembly system 1, or the like. In some embodiments of the invention, the sensors (e.g., a web sensor system, chord sensor system, not illustrated) may be utilized to identify the web members 238, chord members 222, or the like. For example, the sensors (e.g., laser sensors, or the like) may identify the web members 238 (e.g., based on the length of the web members 238) in order to make sure the correct webs have been provided in the materials supply station 40. Moreover, the sensors may identify the position of the web members 238 when loaded on the table in order to identify if they have been placed in the proper location (e.g., to adjust welding if needed). Additionally, the sensors may also detect if the chord members 222 are present and/or have been loaded properly (e.g., and stop the joist assembly system 1, if the incorrect webs members 238 or chord members 222 have been used or positioned, and/or are not present). Furthermore, sensors (e.g., lasers, or the like) may be used to locate where additional parts should be located (e.g., bracing clips, spacers, or the like) that may be assembled manually. Should the sensors identify a potential issue with any of the foregoing, an alert may be sent to a user, the operation of the joist assembly system 1 (or particular device thereof) may be adjusted (e.g., stopped or slowed down). Furthermore, it should be understood that the welding parameters (e.g., time, filler used, route of the welding tip, temperature, or the like may be monitored for each of the welding systems 60) in order to capture data about the welding process for each joist, which may allow the controller 450 to determine if there are any anomalies that occurred in the welding process.

Computer systems (e.g., user computer systems 420) may be provided within, upstream, and/or downstream of the joist assembly system 1 in order to provide operating information to the users. The information displayed may include any alerts identified by the controller 450 in the joist assembly system 1, that may require a user to take an action with respect to a joist 220 and/or the joist assembly system 1. For example, graphical user interfaces may illustrate to users if there are any potential errors in the welds that may require inspection and/or repair after the joist 220 has been discharged from the joist assembly system 1.

In other embodiments of the invention, the welding systems 60 may be replaced or supplemented by other methods of the joining the webs members 238 to the chord members 222. For example, fasteners may be used in order to join the web members 238 to the chord members 222. As such, other joining systems may be implemented should other types of joining of the web members 238 and chord members 222 be utilized.

Figure 17:
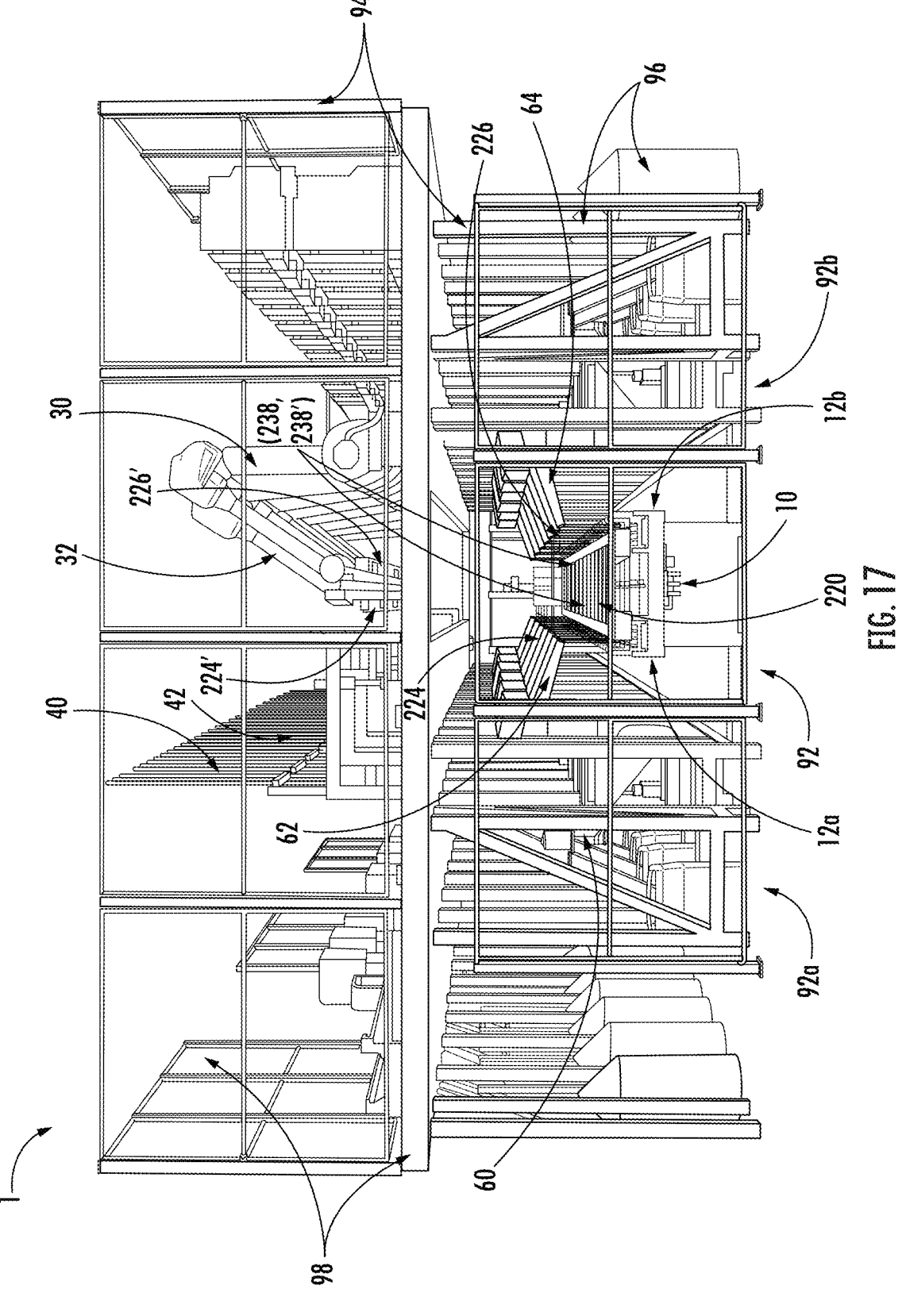
FIG. 17 is a front perspective view of a joist assembly system depicting loading process of additional chord components, in accordance with embodiments of the invention.
Figure 18:
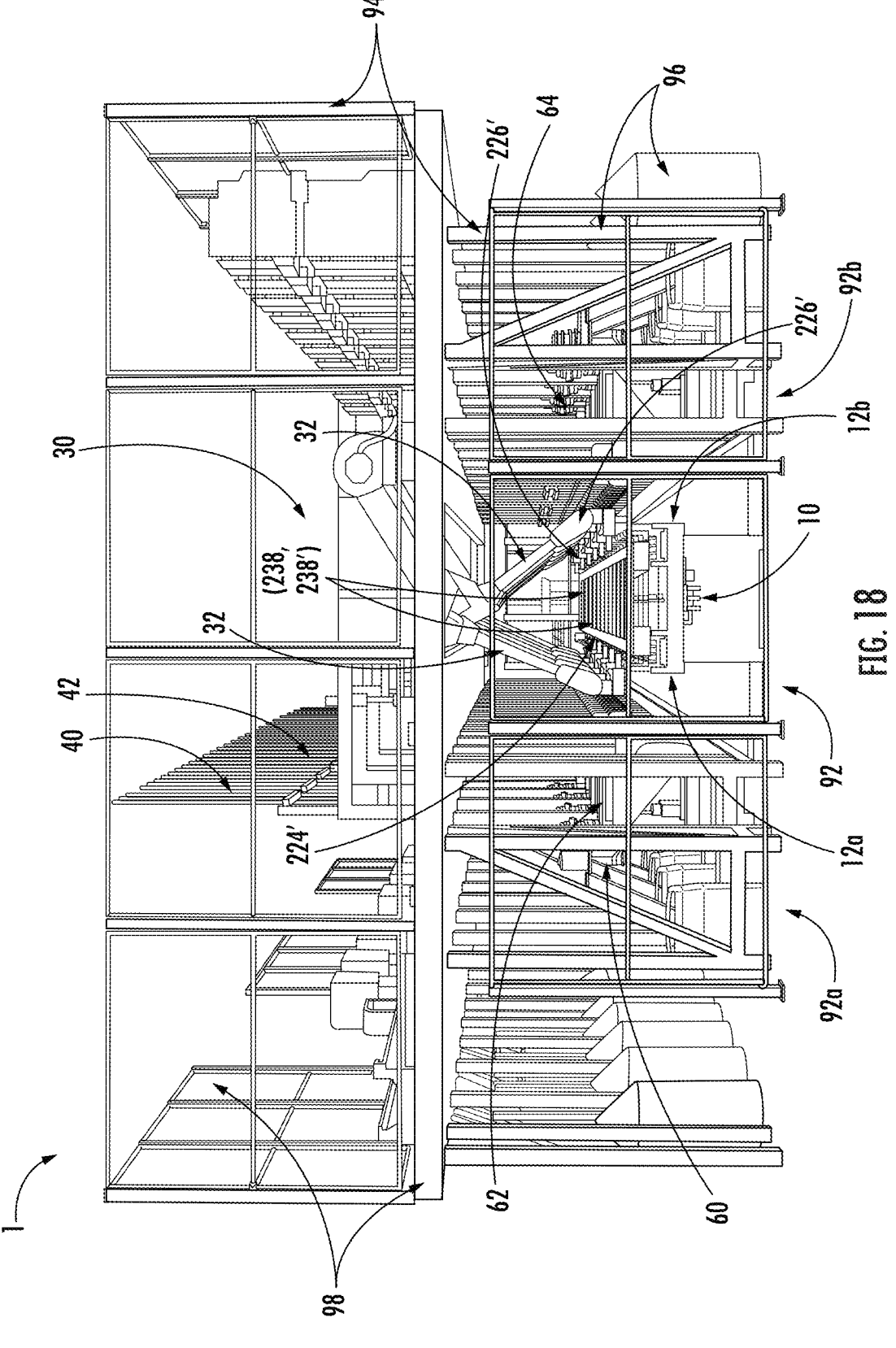
FIG. 18 is a front perspective view of a joist assembly system depicting loading process of additional chord components onto a rigging table system, in accordance with embodiments of the invention.

After welding of the web members 238, the plurality of chord material handling systems 32 of the plurality of material handling systems 30 may load (e.g., retrieve, transport, position, or the like) a second upper chord 224' and a second lower chord 226' from the first picking location 42 of material supply station 40. FIG. 16 illustrates the plurality of chord material handling systems 32 grip a second upper chord 224' and a second lower chord 226' from its storage location at first picking location 42 of the material supply station 40. FIG. 17 illustrates the second upper chord 224' and the second lower chord 226' at an intermediate position in between the transport path from the first picking location 42 to the rigging table system 10. The plurality of chord material handling systems 32 may then position the retrieved second upper chord 224' and second lower chord 226' at the rigging table system 10, as illustrated by FIG. 18. As such, as illustrated, the second upper chord 224' may be positioned over the existing first upper chord 224 and the second lower chord 226' may be positioned over the existing lower chord 226 at the rigging table system 10, with the second upper chord 224' and the second lower chord 226' being spaced apart by a predetermined distance. The second upper chord 224' may be held in place and supported by the plurality of upper chord projections 14a in conjunction with the plurality of upper chord cavities 16a, while the second lower chord 226' maybe held in place and supported by the plurality of lower chord projections 14b in conjunction with the plurality of lower chord cavities 16b, similar to the manner described previously with respect to the first upper and lower chords (224, 226). Subsequently, the plurality of chord material handling systems 32 of the plurality of material handling systems 30 may retract away from the rigging table system 10.

Figure 19A:
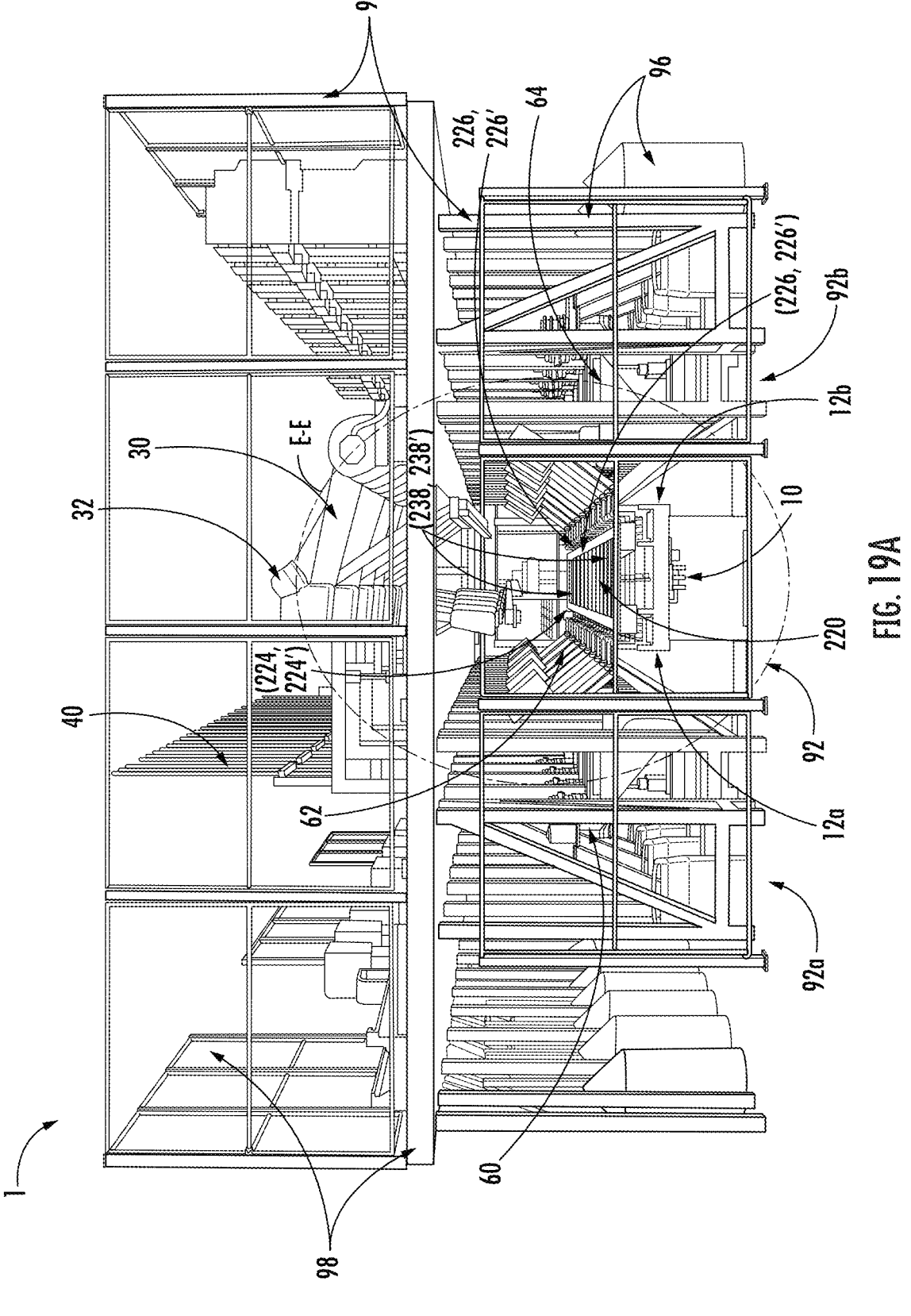
FIG. 19A is a front perspective view of a joist assembly system depicting joining process of additional chord components at a rigging table system, in accordance with embodiments of the invention.
Figure 19B:
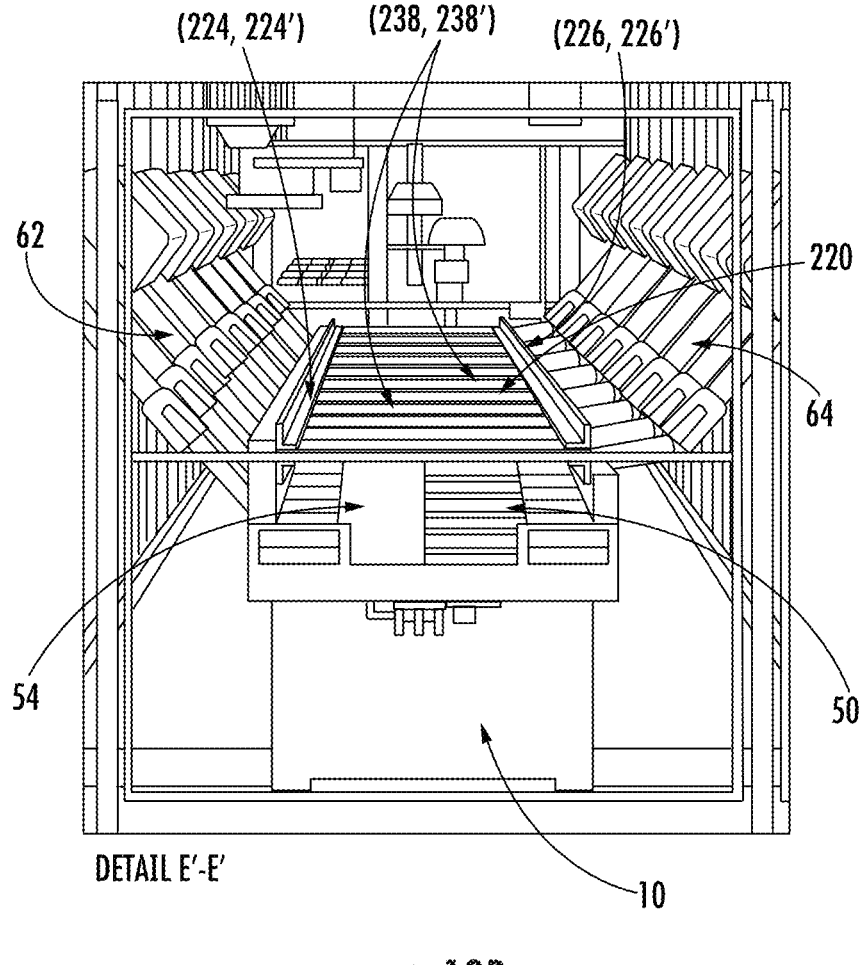
FIG. 19B is an enlarged view of a joist assembly system of FIG. 19A depicting joining process of the additional components at the rigging table system, in accordance with embodiments of the invention.

Next, the plurality of welding systems 60 may move from their default retracted position to a joining position (e.g., extend to move over a cover a predetermined associated work area, also referred to as a work envelope) over the rigging table system 10, as illustrated by FIGS. 19A and 19B. The plurality of first welding systems 62 and plurality of second welding systems 64 may join (e.g., weld) the second upper chord 224' and the second lower chord 226' to the upper chord 224, lower chord 226, the first set of web members 238, the second set of web members 238', spacers, and/or a third set of web members, to thereby form the joist

18

220. The plurality of welding systems 60 may then move to the default retracted position and/or to a maintenance position.

Figure 19C:
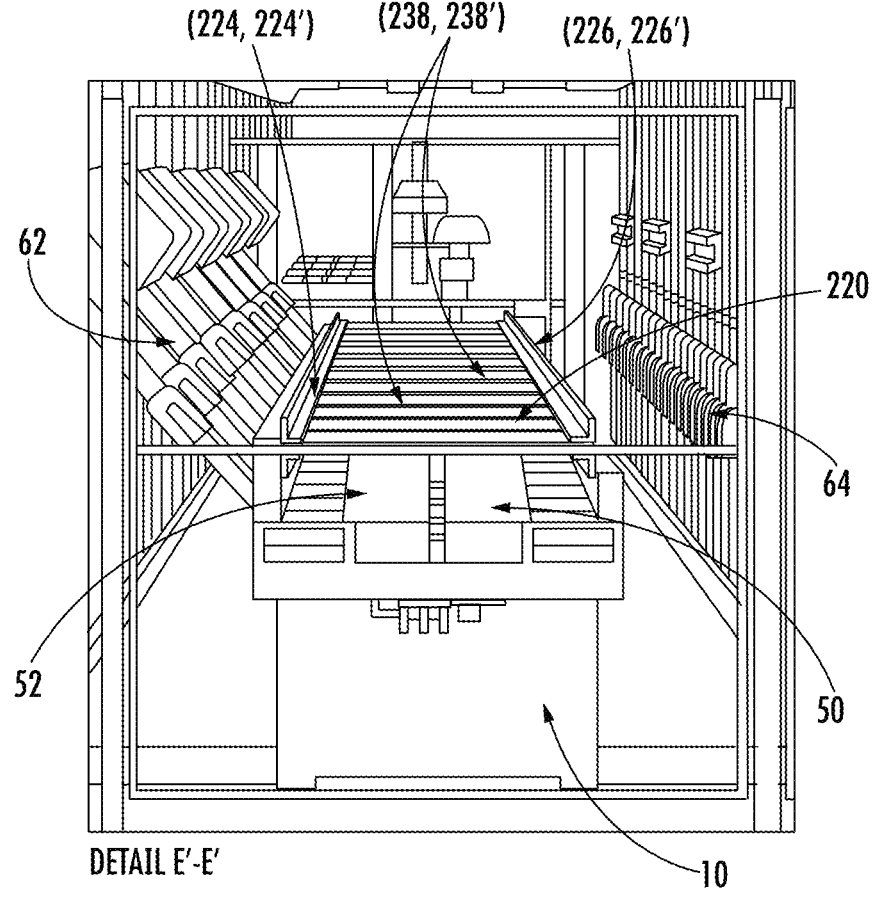
FIG. 19C is an enlarged view of a joist assembly system of FIG. 19A depicting discharging process of a joist assembly from the rigging table system, in accordance with embodiments of the invention.
Figure 20:
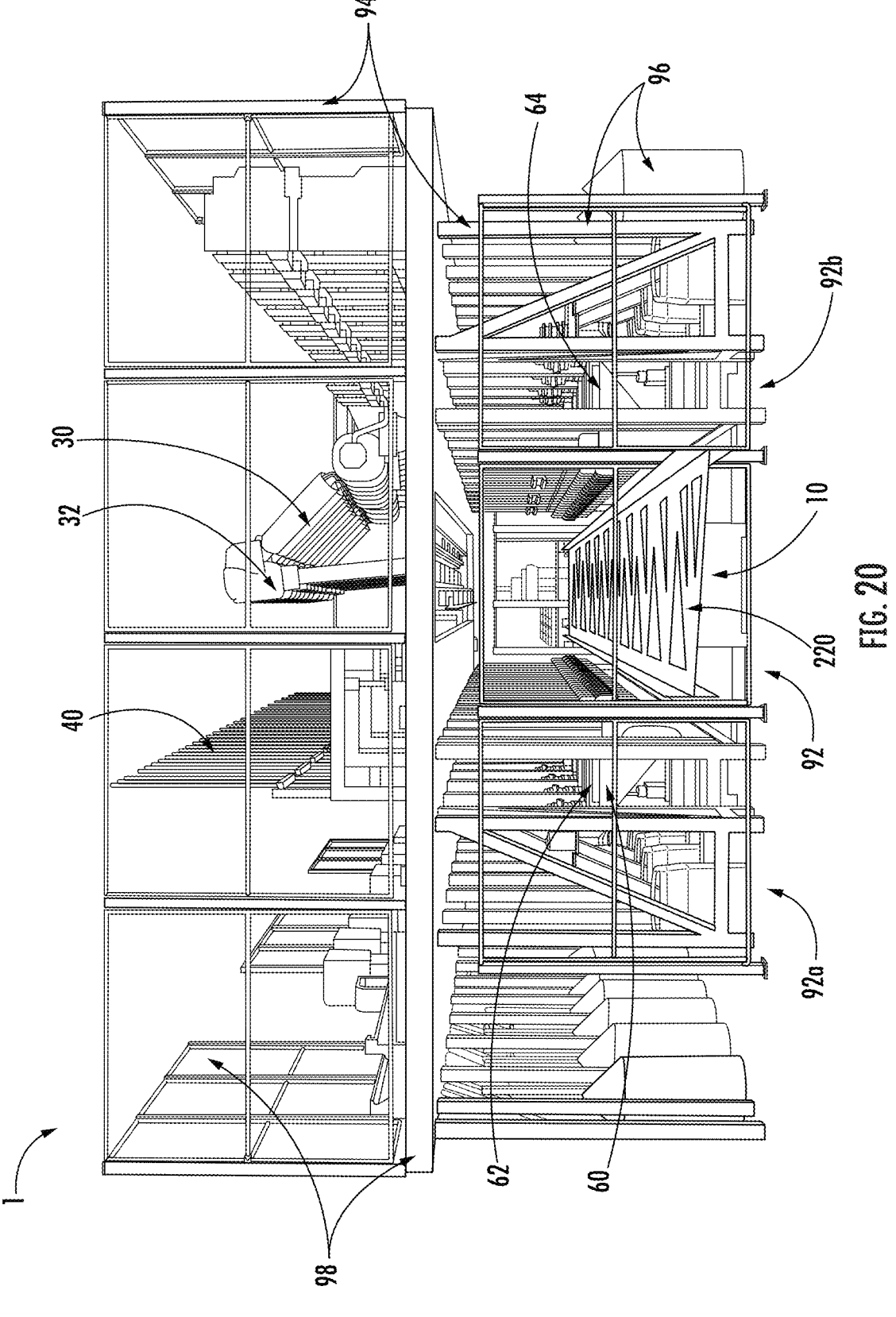
FIG. 20 is a front perspective view of a joist assembly system depicting discharging process of a joist assembly, in accordance with embodiments of the invention.

The discharge process of the constructed joist 220 from the rigging table system 10 will now be described in further detail. In some embodiments of the invention, the discharging system 50 may comprise a plurality of rollers 52. As illustrated by the detail view in FIG. 19B, during or immediately upon assembly of the joist 220, the plurality of rollers 52 of the discharging system 50 may be in a retracted position 54. Next, as illustrated by FIG. 19C, the plurality of rollers 52 may extend upwards (e.g., out of cavities of the rigging table system 10 in which the joist 220 rests. In this way, the extending or extended plurality of rollers 52 may cause the joist 220 to be released from the plurality of upper chord projections 14a, plurality of lower chord projections 14b (and the web jigs 18, if utilized), and lift the joist 220 at least partially above the rigging table system 10. Next, rotation of the plurality of rollers 52 may be activated which causes linear displacement or discharge of the joist 220 out of the rigging table system 10, as illustrated by FIG. 20. The discharged joist 220 may then be lifted and transported to the desired location. The process may be repeated to form additional joists 220.

Web and Chord Supply Systems

Figure 21A:
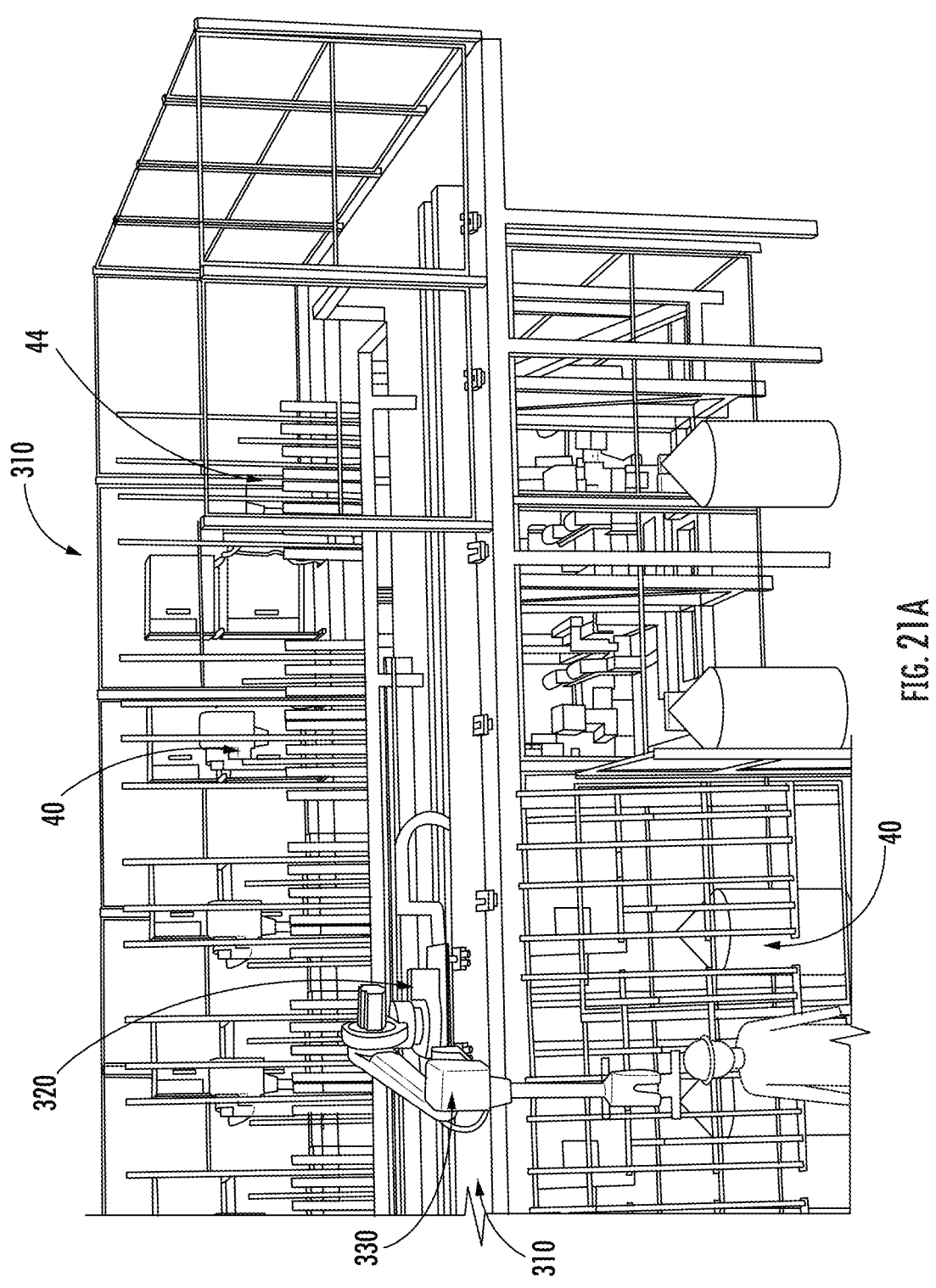
FIG. 21A, is a side perspective view of a web member supply system, in accordance with embodiments of the invention.
Figure 21B:
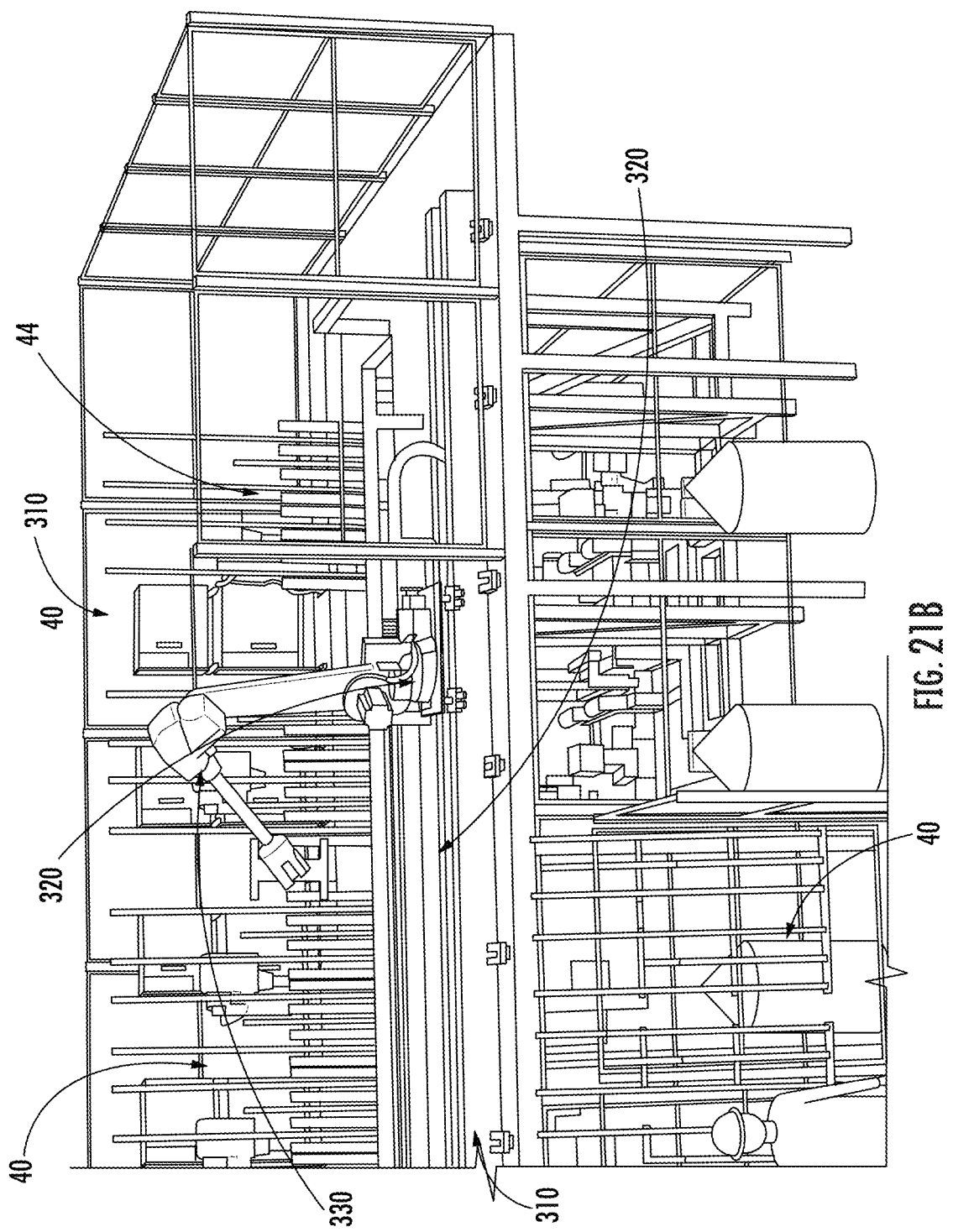
FIG. 21B, is a side perspective view of a web member supply system, in accordance with embodiments of the invention.

As previously discussed herein, the material supply station 40 may comprise a web supply system 302, as illustrated in FIGS. 21A and 21B, and/or a chord supply system 304. The web supply system 302 may comprise a web supply track 310, a web supply carriage 320, and a web supply robot 330. The web supply carriage 320 may move with respect to the web supply track 310, and the web supply robot 330 may move in multiple degrees of freedom, as previously described with respect to other robots described herein. As such, the web supply system 300 may receive web members 238 from adjacent the support structure 94 provided on a support floor 92 (e.g., adjacent a first level 96 located proximate the support floor 92) as illustrated in FIG. 21A, and thereafter, deliver the web members 238 to the material supply station 40 (e.g., at the second picking location 44) as illustrated in FIG. 21B.

Figure 22:
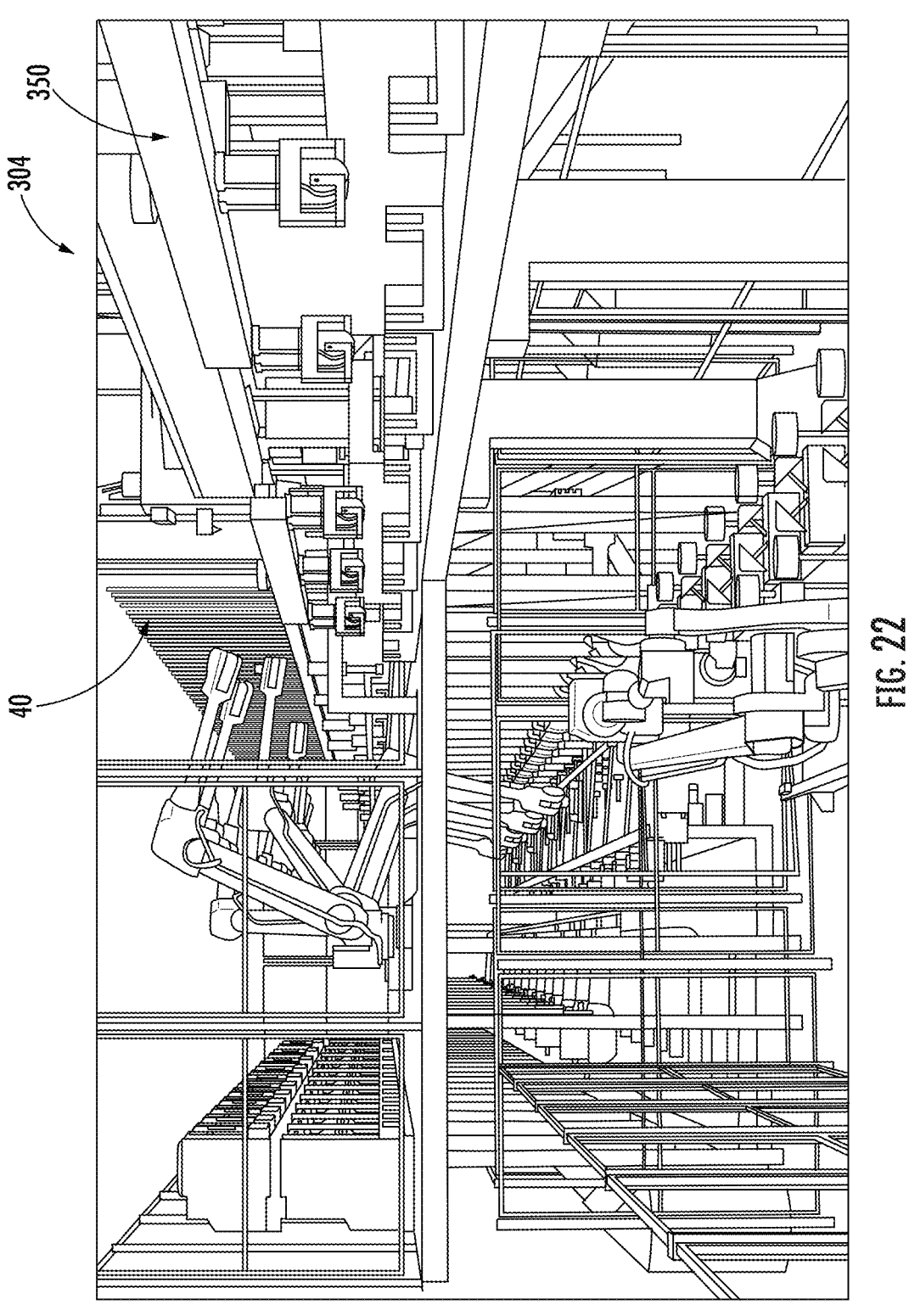
FIG. 22 is an end perspective view of a chord member supply system, in accordance with embodiments of the invention.

In some embodiments, the material supply station 40 may further comprise a chord supply system 304 as illustrated in FIG. 22. The chord supply system 304 may include a conveyor 350 (e.g., track, rollers, belt, or the like) that moves the chords from adjacent the support structure 94 (e.g., adjacent a first level 96, adjacent a second level 98, or the like) and delivers the chord members 222 to the material supply station 40 (e.g., at the first picking location 42). In alternate embodiments, the chord supply system 304 may be similar to the web supply system 302. In some embodiments the chord supply system 304 and the web supply system 302 may be a single system that allows for the delivery of both the web members 238 and the chord members 220 to the material supply station 40.

Controller Systems

The operation of the joist assembly system 1, including the plurality of material handling systems 30, a plurality of welding systems 60, the material supply stations 40 (e.g., including the chord and/or web supply systems 300), the rigging table system 10, and/or the like, and the devices (e.g., robots, carriages, actuators, weld feeders, weld tip cleaners, or the like), are controlled by a programmable controller 450, which may communicate with other systems within or outside of a facility. As such, FIG. 23 illustrates a joist assembly network system 400, in accordance with embodiments of the present disclosure. As illustrated in FIG.

23, one or more controller systems 410 are operatively coupled, via a network 402, to one or more user computer systems 420, one or more device systems 430 (e.g., systems that control the robots, carriages, actuators, weld feeders, weld tip cleaners, or the like of the joist assembly system 1), and/or one or more other systems (not illustrated). In this way, the controller systems 410 operating the joist assembly system 1 may communicate with one or more device systems 430 for assembling the joists as described herein. The controller systems 410 may communicate with user computer systems 420 to allow the users of the user computer systems 420 to monitor the joist assembly system 1. Moreover, the controller systems 410 may communicate with other systems, such as other systems of other machinery in the facility and/or other systems outside of the facility (e.g., ordering systems, third party systems, or the like) to determine what chords 222 and/or webs 238 need to be provided to joist assembly system 1. The communications may occur over a network 402, as will be described in further detail herein.

The network 402 may be a global area network (GAN), such as the Internet, a wide area network (WAN), a local area network (LAN), or any other type of network or combination of networks. The network 402 may provide for wireline, wireless, or a combination of wireline and wireless communication between systems, services, components, and/or devices on the network 402.

As illustrated in FIG. 23, the one or more controller systems 410 may comprise a controller 450 that may generally comprise one or more communication components 412, one or more processing components 414, and one or more memory components 416. The one or more processing components 414 are operatively coupled to the one or more communication components 412, and the one or more memory components 416. As used herein, the term "processing component" generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components may include functionality to operate one or more software programs based on computer-readable instructions thereof, which may be stored in the one or more memory components.

The controller 450 components, such as the one or more communication components 412, may be operatively coupled to the one or more sensors 440 (e.g., safety sensors, supply sensors, location sensors, laser sensors, or the like) as previously discussed herein) located within the joist assembly system 1.

The one or more processing components 414 use the one or more communication components 412 to communicate with the network 402 and other components on the network 402, such as, but not limited to, the components of the one or more user computer systems 420, the one or more device systems 430, and/or the one or more other systems (not illustrated). As such, the one or more communication components 412 generally comprise a wireless transceiver, modem, server, electrical connection, electrical circuit, or other component for communicating with other components on the network 402. The one or more communication components 412 may further include an interface that accepts one or more network interface cards, ports for connection of network components, Universal Serial Bus (USB) connectors, or the like. Moreover, the one or more communication components 412 may include a keypad, keyboard, touch-screen, touchpad, microphone, mouse, joystick, other pointer component, button, soft key, and/or other input/output component(s) for communicating with the users. In some embodiments, as described herein the one or more communication components 412 may comprise a user interface, such as a graphical user interface 455 that allows a user to control and/or monitor the operation of the joist assembly system 1.

As further illustrated in FIG. 23, the one or more controller systems 410 comprise computer-readable instructions 418 stored in the one or more memory components 416, which in some embodiments includes the computer-readable instructions 418 of the one or more controller applications 417 (e.g., used to operate the joist assembly system 1 and/or the devices thereof, or the like). In some embodiments, the one or more memory components 416 include one or more data stores 419 for storing data related to the joist assembly system 1, including, but not limited to, data created, accessed, and/or used by the one or more controller systems 410 to operate the one or more joist assembly systems 1 in order to form the joists (e.g., in accordance with joist specifications that may be stored, or the like).

As illustrated in FIG. 23, users may communicate with each other over the network 402 and the controller systems 410, the device systems 430, and/or other systems in order to control and/or monitor the various systems at the joist assembly system 1 and/or remotely. Consequently, the one or more users may be assemblers, welders, employees, agents, representatives, officers, or the like of an organization operating the facility. The one or more user computer systems 420 may be a desktop, laptop, tablet, mobile device (e.g., smartphone device, or other mobile device), or any other type of computer that generally comprises one or more communication components 422, one or more processing components 424, and one or more memory components 426. In some embodiments the one or more computer systems 420 may be located upstream or downstream of the joist assembly system 1 and are used for pre-assembly and/or pre-inspections of the chords 222 and/or webs 238 (e.g., assembly of the bracing clips and/or spacers, or the like), and/or post assembly and/or post-inspection of the joists 220 (e.g., complete the welding, inspect welding, and/or the like).

The one or more processing components 424 are operatively coupled to the one or more communication components 422, and the one or more memory components 426. The one or more processing components 424 use the one or more communication components 422 to communicate with the network 402 and other components on the network 402, such as, but not limited to, the one or more controller systems 410, the one or more device systems 430, and/or the other systems (not illustrated). As such, the one or more communication components 422 generally comprise a wireless transceiver, modem, server, electrical connection, or other component for communicating with other components on the network 402. The one or more communication components 422 may further include an interface that accepts one or more network interface cards, ports for connection of network components, Universal Serial Bus (USB) connectors and the like. Moreover, the one or more communication components 422 may include a keypad, keyboard, touch-screen, touchpad, microphone, mouse, joystick, other pointer component, button, soft key, and/or other input/output component(s) for communicating with the users. In some embodiments, the one or more communication components 422 may comprise a user interface, such as a graphical user interface that allows a user to remotely control and/or monitor the operation of the joist assembly system 1.

As illustrated in FIG. 23, the one or more user computer systems 420 may have computer-readable instructions 428 stored in the one or more memory components 426, which in some embodiments includes the computer-readable instructions 428 for user applications 427, such as dedicated applications (e.g., apps, applet, or the like), portions of dedicated applications, a web browser or other apps that allow access to applications located on other systems, or the like. In some embodiments, the one or more memory components 426 include one or more data stores 429 for storing data related to the one or more user computer systems 420, including, but not limited to, data created, accessed, and/or used by the one or more user computer systems 420. The user application 427 may use the applications of the one or more controller systems 410, the one or more product systems 430, and/or one or more other systems (not illustrated) in order to communicate with other systems on the network 402 and take various actions described herein (e.g., operation, use, monitoring, or the like the joist assembly system 1).

Moreover, as illustrated in FIG. 23, the one or more device systems 430 and/or other systems (not illustrated) have components the same as or similar to the components described with respect to the one or more controller systems 410 and the one or more user computer systems 420 (e.g., one or more communication components, one or more processing components, one or more sensors, one or more memory devices with computer-readable instructions of one or more product applications, one or more datastores, or the like). Thus, the one or more device systems 430 communicate with the one or more controller systems 410, the one or more user computer systems 420, and/or one or more other systems in the same or similar way as previously described with respect to the one or more controller systems 410, the one or more user computer systems 420, and/or the one or more other systems. The one or more device systems 430 may comprise the systems that operate the machines (e.g., robots, carriages, rollers, actuators, or the like) of the joist assembly system 1 that are used to assemble the joists 220.

Process of Forming a Joist

FIG. 24 illustrates a process flow for assembling a joist 220 using the joist assembly system 1 described herein. As illustrated by block 502, the specifications for a joist are selected. The specifications may be stored in the controller systems 410. For example, a user may store specifications for different types of joists 220, and a user may select one joist of the plurality of joists for assembly, or otherwise may select one or more specifications in order to determine the joist 220 to be assembled. The controller 450 uses the specifications in order to determine how to operate the joist assembly system 1 for assembling the joist 220 selected.

Block 504 of FIG. 23 further illustrates that the chords 222 and/or webs 238 are provided to the supply systems 300 (e.g., webs supply system 302, chord supply system 304, or the like). The chords 222 and/or webs 238 may have bracing clips, spacers, and/or other components pre-assembled before, during, or after delivery to the supply systems 300.

FIG. 23 further illustrates in block 506 that the supply systems 300 deliver the chords 222 and/or webs 238 to the material supply station 40. As previously discuss herein the material supply station 40 may be located at least partially above the rigging table system 10. In some embodiments the chords 222 and/or web 238 may already be located in the material supply station when the user makes the selection of a specification for a joist 220.

Block 508 illustrates that the rigging table system 10 may be adjusted based on the type of joist 220 being assembled (e.g., the projections of the rigging table may be adjusted farther apart or closer together for receipt of the first upper and lower chords). The adjustment may occur manually and/or automatically through the use of the controller 450 or other system.

FIG. 23 further illustrates in block 510 that the material handling systems 30 pick a first upper chord portion 224a and a first lower chord portion 226a and deliver it to the rigging table system 10 and then retract to pick additional members. The material handling systems 30 place the chord portions 224a, 226a within the chord projections 14 in order to hold the first chord portions 224a, 226a in place.

Block 512 of FIG. 23 illustrates that the material handling systems 30 pick one or more sets of webs 238 (e.g., vertical, diagonal, or the like) from the material supply station 40 and deliver the one or more sets of webs 238 to the rigging table 10. For example, the material handling systems 30 may hold the webs 238 in the desired position on the first upper and lower chord portions 224a, 226a for welding.

FIG. 23 illustrates in block 514 that the one or more welding systems 60 weld the one or more sets of webs 238 (e.g., vertical, diagonal, or the like) to the first upper and lower chord portions 224a, 226a. In some embodiments, the welding starts as the material handling systems 30 hold the webs 238, which are then retracted as the welding is completed.

Block 516 of FIG. 23 further illustrates that the material handling systems 30 pick a second upper chord portion 224b and a second lower chord portion 226b from the material supply station 40 and delivers them to the rigging table 10, such as over the webs 238 and/or spacers of the first upper and lower chords 224a, 226a.

FIG. 23 further illustrates in block 518 that in some embodiments the one or more welding systems 60 weld (e.g., tact weld or completely weld) the first upper chord portion 224b and the second lower chord portion 226b to the webs 238 and/or spacers of the first upper and lower chord portions 224a, 226a.

Block 520 further illustrates in FIG. 23 that the joist 220 is discharged from the rigging table and moved downstream of the rigging table system 10. For example, the rollers of the rigging table system 10 may be engaged (e.g., raised, or the like), which lifts the joist 220 out of the projections on the rigging table system 10. The rollers may then be activated to roll the joist 220 downstream off of the rigging table system 10. However, it should be understood that systems in addition to, or other than, rollers 52 may be used to discharge the joists 220 from the rigging table system 10 (e.g., arm that lifts, overhead track, or the like). In some embodiments users located downstream of the rigging table system 10 may complete the welds between the second upper and lower chord portions 224b, 226b and the webs 238 and/or the spacers of the first upper and lower chord portions 224a, 226a. In some embodiments, some locations of the joists 220 may be difficult to access using the welding systems 60, as such, some hand welding may be performed.

FIG. 23 further illustrates in block 522 that notifications may be provided to users downstream on the user computer systems 420. The notifications may be alerts related to the assembly of the joist 220, such as potential welds that need to be checked and/or corrected. Other notifications may include locations where apertures may need to be formed into the joists 220 (alternatively, the apertures may be pre-formed in the chords 222 and/or webs 238 before being assembled), additional components that need to be added to joists 220 (e.g., bracing clips), joist seats that need to be added to the joists 220, or the like.

The joist assembly system 1 described herein provides improvements to conventional rigging tables that require users to physically pick up the members, lift them over their heads, turn around, and/or otherwise perform a physical operation that could cause harm to the workers, other workers, or otherwise interrupt the process of assembling joists on the rigging table. The joist assembly system 1 described herein may be able to assemble joists 220 more efficiently, with less variation, at an increased rate, or the like when compared to conventional rigging tables.

As will be appreciated by one of skill in the art in view of this disclosure, embodiments of the invention may be embodied as an apparatus, a system, computer program product, and/or other device, a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a system. Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Small-talk, C++ or the like. However, the computer program code/computer-readable instructions for carrying out operations of the invention may also be written in conventional procedural programming languages, such as the "C" programming language or similar programming languages.

As described herein, when discussing the movement of the members, components and the like as being vertical, horizontal, etc., it is understood that the movements in the vertical direction or horizontal direction may not be exactly vertical or horizontal, such that the term substantially or generally vertical or horizontal includes movements and/or components that are exactly vertical or horizontal, or out of the exact vertical or horizontal plane.

It should be understood that "operatively coupled," when used herein, means that the components, devices, members, or the like may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A joist assembly system, comprising:
   a support structure having a structural framework;
   a rigging table system;
   a plurality of material handling systems supported by the structural framework;
   a plurality of welding systems located adjacent the rigging table system, wherein the plurality of material handling systems are supported above the rigging table system and the plurality of welding systems;
   a material supply station located adjacent the support structure;
   a controller system comprising:
      one or more memory components storing computer-readable code; and
      one or more processing components operatively coupled to the one or more memory components, wherein when executed the computer-readable code is configured to cause the one or more processing components to:
         communicate with two or more material handling systems of the plurality of material handling systems to pick two or more webs from webs in the material supply station and position the two or more webs with respect to an upper chord and a lower chord on the rigging table system; and
         communicate with two or more welding systems of the plurality of welding systems to weld the two or more webs to the upper chord and the lower chord at the same time.

2. The joist assembly system of claim 1, wherein when executed the computer-readable code is configured to cause the one or more processing components to:
   communicate with one or more material handling systems of the plurality of material handling systems to pick the upper chord and the lower chord from the material supply station and position the upper chord and the lower chord on the rigging table system.

3. The joist assembly system of claim 2, wherein the upper chord comprises a first upper chord portion and a second upper cord portion, wherein the lower chord comprises a first lower chord portion and a second lower chord portion, and wherein when executed the computer-readable code is configured to cause the one or more processing components to:
   communicate with the one or more material handling systems of the plurality of material handling systems to pick the first upper chord portion and the first lower chord portion from the material supply station and position the first upper chord portion and the first lower chord portion on the rigging table system, and wherein the two or more welding systems weld the two or more webs to the first upper chord portion and the first lower chord portion;

communicate with the one or more material handling systems of the plurality of material handling systems to pick the second upper chord portion and the second lower chord portion from the material supply station and position the second upper chord portion and the second lower chord portion onto the two or more webs, and wherein the two or more welding systems weld the second upper chord portion and the second lower chord portion to the two or more webs.

4. The joist assembly system of claim 1, wherein the material supply station comprises:

a first picking location configured to store chord portions for picking by a plurality of chord material handling systems; and a second picking location configured to store the webs for picking by a plurality of web handling systems.

5. The joist assembly system of claim 1, wherein the material supply station comprises:

a web supply system that moves the webs to a location of the material supply station.

6. The joist assembly system of claim 5, wherein the web supply system comprises one or more web supply robots, and wherein when executed the computer-readable code is further configured to cause the one or more processing components to communicate with the one or more web supply robots to deliver the webs to the location of the material supply station.

7. The joist assembly system of claim 6, wherein the web supply system further comprises:

a web supply track; and a web supply carriage operatively coupled to the one or more web supply robots;

wherein the web supply carriage is configured to move the one or more web supply robots to deliver the webs to the location of the material supply station adjacent the plurality of material handling systems.

8. The joist assembly system of claim 1, wherein the material supply station comprises:

a chord supply system comprising a conveyor that moves the upper chord or the lower chord to a location of the material supply system or to the rigging table system.

9. The joist assembly system of claim 8, wherein the conveyor comprises a track, rollers, or a belt.

10. The joist assembly system of claim 1, wherein the material supply station comprises:

a chord supply system comprising one or more chord supply robots, and wherein when executed the computer-readable code is further configured to cause the one or more processing components to communicate with the one or more chord supply robots to deliver the chords to a location of the material supply station or to the rigging table system.

11. The joist assembly system of claim 10, wherein the chord supply system further comprises:

a chord supply track; and a chord supply carriage operatively coupled to the one or more chord supply robots;

wherein the chord supply carriage is configured to move the one or more chord supply robots to deliver the chords to the location of the material supply station or to the rigging table system.

12. The joist assembly system of claim 1, wherein the structural framework comprises:

a first level and a second level, wherein the plurality of material handling systems are located on the second level, and the plurality of welding systems are located on the first level.

13. The joist assembly system of claim 12, wherein the rigging table system is located on the first level.

14. The joist assembly system of claim 1, wherein the plurality of material handling systems comprise:

a plurality of chord material handling systems, wherein the plurality of chord material handling systems are configured to pick the upper chord and the lower chord; and a plurality of web material handling systems, wherein the plurality of web material handling systems are configured to pick the webs.

15. The joist assembly system of claim 1, wherein the two or more material handling systems of the plurality of material handling systems are configured to hold the two or more webs in place to restrict movement of the two or more webs while the two or more welding systems at least partially weld the two or more webs to the upper chord and the lower chord.

16. The joist assembly system of claim 1, wherein the plurality of material handling systems comprise one or more material handling robotic arms and a material handling effector.

17. The joist assembly system of claim 1, wherein the plurality of welding systems comprise:

a plurality of first welding systems adjacent a first side of the rigging table system, wherein the plurality of first welding systems are configured to weld the two or more webs to the upper chord; and a plurality of second welding systems adjacent a second side of the rigging table system, wherein the plurality of second welding systems are configured to weld the two or more webs to the lower chord.

18. The joist assembly system of claim 1, wherein the plurality of welding systems comprise one or more welding robotic arms and a welder.

19. The joist assembly system of claim 1, wherein the rigging table system comprises:

a plurality of upper chord projections spaced apart to form a plurality of upper chord cavities, wherein the plurality of upper chord cavities are configured to hold the upper chord; and a plurality of lower chord projections spaced apart to form a plurality of lower chord cavities, wherein the plurality of lower chord cavities are configured to hold the lower chord;

wherein the plurality of upper chord projections or the plurality of lower chord projections allow the upper chord to be spaced different distances from the lower chord.

20. A method of assembling a joist using the joist assembly system of claim 1, the method comprising:

positioning the upper chord and the lower chord at the rigging table system;

picking the two or more webs from the material supply station;

positioning the two or more webs with respect to the upper chord and the lower chord at the rigging table system; and welding the two or more webs to the upper chord and the lower chord.

\* \* \* \* \*